(12) United States Patent
Malthe-Sorenssen et al.

(10) Patent No.: US 7,043,410 B2
(45) Date of Patent: May 9, 2006

(54) METHOD OF MODELING OF FAULTING AND FRACTURING IN THE EARTH

(75) Inventors: Anders Malthe-Sorenssen, Oslo (NO); Thomas Walmann, Østerås (NO); Torstein Jossang, Oslo (NO); Geri Wagner, Allschwil (CH); Jens Feder, Oslo (NO); Humphrey H. Hardy, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 937 days.

(21) Appl. No.: 09/949,966

(22) Filed: Sep. 10, 2001

(65) Prior Publication Data

US 2002/0091502 A1 Jul. 11, 2002

Related U.S. Application Data

(63) Continuation-in-part of application No. 09/542,307, filed on Apr. 4, 2000, now Pat. No. 6,370,491.

(51) Int. Cl.
*G06F 17/50* (2006.01)
*G01V 1/28* (2006.01)

(52) U.S. Cl. ............... 703/2; 703/10; 702/6; 702/14; 702/57

(58) Field of Classification Search ............... 703/1–2, 703/10; 702/11–18, 6, 57; 367/73
See application file for complete search history.

(56) References Cited

U.S. PATENT DOCUMENTS 4,821,164 A 4/1989 Swanson ............... 364/420

(Continued)

OTHER PUBLICATIONS

Panovko et al, "Vibration Impact Processes in Systems with Viscous-Elastic Limiters", Proceedings of the Third European Nonlinear Oscillations Conference, Aug. 1999 (text downloaded from http://www.imm.dtu.dk/~mps/ENOC/proceedings).*

(Continued)

*Primary Examiner*—Thai Phan
(74) *Attorney, Agent, or Firm*—Madan, Mossman & Sriram, PC

(57) ABSTRACT

A computer implemented method for modeling of faulting and fracturing uses "small scale rules" to produce large-scale results. One part of the method is a user interface for inputting deformations, preexisting faults and fractures, and material rock properties. The second part of the software is the code that solves the motion of each point or node in the subsurface volume defined by the user interface. The model may be defined in one of three modes: an aerial mode, in which the model is 2-dimensional with the material and a substrate on a horizontal plane; a cross-sectional mode similar to the aerial mode except that the nodes are in a vertical cross section and gravity is included in the model; and a 3-D model that is an extension into a third dimension of the 2-D model and deformation may be applied to the bottom and four sides of the material region.

A modified over-relaxation approach, wherein the over-relaxation is concentrated in those nodes where the greatest movement occurs, is used to solve for the deformation. This significantly speeds up the computation time. The model is "conditioned" to increase the likelihood that the deformation pattern resulting from the simulation of the deformation will at least duplicate an observed large-scale deformation. As an aid to the simulation, an "anticipate" step provides a quick solution to the deformation without including the effects of faulting.

18 Claims, 14 Drawing Sheets

U.S. PATENT DOCUMENTS

| | | | |
|---|---|---|---|
| 4,991,095 A | 2/1991 | Swanson | 364/421 |
| 5,606,517 A | 2/1997 | Traub et al. | 364/578 |
| 5,659,135 A | 8/1997 | Cacas | 73/152.02 |
| 5,661,698 A | 8/1997 | Cacas | 367/73 |
| 5,815,154 A | 9/1998 | Hirschtick et al. | 345/356 |
| 5,838,634 A | 11/1998 | Jones et al. | 367/73 |
| 5,844,564 A | 12/1998 | Bennis et al. | 345/423 |
| 5,953,680 A | 9/1999 | Divies et al. | 702/5 |
| 6,035,255 A | 3/2000 | Murphy et al. | 702/11 |
| 6,038,514 A | 3/2000 | Nozaki | 702/27 |
| 6,044,328 A | 3/2000 | Murphy et al. | 702/11 |
| 6,070,125 A | 5/2000 | Murphy et al. | 702/11 |
| 6,089,744 A | 7/2000 | Chen et al. | 364/578 |

OTHER PUBLICATIONS

D.M.de G. Allen; Chapter 2, Linear Algebraic Equations (continued), Relaxation Methods, McGraw Hill N.Y. 1954, pp. 12, 14-23.

* cited by examiner

METHOD OF MODELING OF FAULTING AND FRACTURING IN THE EARTH

CROSS REFERENCES TO RELATED APPLICATIONS

This application is a continuation-in-part of U.S. patent application Ser. No. 09/542,307 filed on Apr. 4, 2000, now U.S. Pat. No. 6,370,491.

BACKGROUND OF THE INVENTION

1. Field of the Invention

The invention relates to a method for forward modeling the spatial distribution faults and fractures in a geologic formation.

2. Background of the Invention

The prediction of faulting and fracturing is very important in oil and gas exploration and production. Seismic data is often used to find faults that bound or delineate hydrocarbon reservoirs. However, due to the limited resolution of seismic data, the details of the faulting in the subsurface may not be determinable.

Knowledge of the distribution of the fractures in a geologic formation is of great importance first for optimizing the location and the spacing between the wells that are to be drilled through an oil formation. Furthermore, the geometry of the fracture network influences the displacement of fluids on the reservoir scale as well as on the local scale, where it determines the elementary matrix blocks in which the oil is trapped. Knowledge of the distribution of the fractures is thus also very useful at a later stage for the reservoir engineer who wants to extrapolate the production curves and to calibrate the models simulating reservoirs. The development of naturally fractured reservoirs thus requires better knowledge of the geometry of the fracture networks and of their contribution to the orientation of the flows.

Seismic data are commonly used for acquiring information about the subsurface of the Earth. Changes in the elastic properties of subsurface rocks appear as seismic reflections. Such changes in the properties of the rocks typically occur at boundaries between geologic formations, at fractures and at faults. The vertical resolution of the seismic method is approximately one-quarter wavelength of the seismic wave and, in typical situations, is of the order of 10 meters. The horizontal resolution is determined by the size of the Fresnel zone for the seismic wave at the depth of interest and may be tens or even hundreds of meters. By using sophisticated processing techniques, such as prestack migration taking advantage of data redundancy, the positions of the seismic reflectors may be more accurately determined up to the spacing of the geophones. Nevertheless, it is only the major seismic reflectors that may be determined by this method. Additional information about finer scale faulting and fracturing would be very useful in predicting flow characteristics of a hydrocarbon reservoir and in development of a program for optimization of hydrocarbon recovery. Since all faults are not clearly delineated by the seismic, it would also be useful to verify that the location of faults that are difficult to see seismically are interpreted in a consistent manner.

U.S. Pat. No. 5,953,680 issued to Divies et al describes a method for creating a two-dimensional (2-D) kinematic model of a geologic basin affected by faults. The basin is divided into a number of layers or banks whose geometric positions are known. The tectonic deformation of each modeled layer is determined separately by taking its thickness and length into account, with compaction being taken into account. The basic assumption is that the banks are competent units that undergo little deformation. The method does not include the material properties of the rocks as part of the input and hence is not particularly well suited for determining the effects of loading.

U.S. Pat. No. 5,838,634 issued to Jones et al obtains geologic models of the subsurface that are optimized to match as closely as feasible geologic constraints known or derived from observed geologic data. The models also conform to geophysically based constraints indicated by seismic survey data. It accounts for geophysical information by converting the geologic model to synthetic seismic traces, accounting for fluid saturation, and comparing these traces with observed seismic trace data. The process perturbs the rock properties in the geologic model until the geologic model is consistent with geologic and geophysical data and interpretations. However, the issue of how to obtain a reasonable fine-scale geologic model is not addressed.

Broadly speaking, four different ways have been used to model the problem of geologic modeling of the subsurface on a wide range of scales. The first approach is to use statistics to capture the number and orientation of faults at one scale or in one deformational setting and to use simple statistical rules to extrapolate this information to other scales or deformational settings. An example of this is U.S. Pat. No. 5,659,135 to Cacas.

A second method that has been used is to use finite element modeling to solve the stress field from given input deformations. Once stress exceeds a given amount a fault or fracture is drawn in by hand and then the model simulation can continue. Alternatively, faulting patterns are put in by hand, and the formation is pressured up to estimate a stress distribution. The rock is modeled as a network of distinct elastic elements, connected by elastic connection to its outer boundaries. The main obstacles to the application of such methods for geologic modeling are the computer time and the human interaction that is involved. The computer time roughly increases as the square of the number of nodes in the model and the models must be continuously interacted with by the user to put in new faults as they are believed to have occurred.

In a third method, large scale rules of geometry or faulting seen in the subsurface under certain deformation conditions are quantified and applied to forward modeling software. These forward models usually consist of a well-defined set of large scale shapes that are expected to be produced. An example of this is U.S. Pat. No. 5,661,698 issued to Cacas, which starts out with a group of major faults detected by means of an exploration of the zone, and additional minor faults that have not been detected during the exploration. The fractal characteristics of the major faults are determined and the additional minor faults are constrained to have the same fractal characteristics. The fractal characteristics used include the fractal dimension of the fault network and a density function defining a distribution of lengths of the faults. Such a method does not account for differences in the rock properties of different geologic formations and differences in their mode of faulting.

A fourth method that has been used is the so-called "distinct element model." It uses small scale rules of stress and strain to move nodes in a model to predict faulting and fracturing. It is well suited for problems of geologic fracturing but suffers from the drawback of being computationally slow. In addition, the methods are not particularly user friendly in terms of user interface used for specification of the model and of the material properties.

There is a need for an invention that is able to simulate faulting and fracturing on a variety of scales in a subsurface geological model. Such an invention should preferably take into account the differences in material strength of different types of rocks. Such an invention should also be computationally fast. In addition, it is preferable that the invention should be user friendly in that specification of the rock properties and loading be easily input and that the invention be able to provide graphical displaces of the deformation process. The present invention satisfies this need.

SUMMARY OF THE INVENTION

The present invention is a computer-implemented method for modeling of faulting and fracturing that uses "small scale rules" to produce large scale results. Organizationally, the software for the invention is made up of two parts. One part is a user interface for inputting deformations, pre-existing faults and fractures, and material rock properties. The second part of the software is the code that solves the motion of each point or node in the subsurface volume defined by the user interface. The solution code solves the forces on each node and their resulting movement. Faults and fractures occur as the nodes are widely separated and the forces between the nodes (that are based on the node locations) are changed. The user interface may be used to produce a quick look at the deformation results and to view the results of the full simulation.

Functionally, as with all modeling programs, the present invention has two primary components. The first is the model definition and the second is the response of the model to the applied deformation and stresses. In the present invention, there is a third important component: a graphical user interface that is very useful in both the model definition and in viewing the results of the applied deformation and stresses.

The model may be defined in one of three modes. In the aerial mode, the model is 2-dimensional with the material and a substrate on a horizontal plane. A nodal pattern that, in the preferred embodiment, is a regular triangular lattice is used for the model definition, although any other space-filling nodal pattern may also be used. An alternate embodiment of the invention allows for randomly positioned nodes in a so-called "disordered lattice." The deformation can be applied to any point in the substrate and the resulting response determined. The cross-sectional mode is similar to the aerial mode except that the nodes are in a vertical cross section and gravity is included in the model. The substrate attachment is limited to the bottom and sides of the material region. The 3-D model is an extension into a third dimension of the 2-D model and deformation may be applied to the bottom and four sides of the material region.

The computational method used in solving for the deformation is a modified over-relaxation approach. In the basic over-relaxation method, equilibrium is reached by moving each node a distance proportional to the force acting on the node. The constant of proportionality is called the over-relaxation constant and optimal methods for selecting it are known. In each relaxation cycle, each node is moved and the relaxation cycles repeated until no node is moved further than a threshold distance, which is called the relaxation threshold. In the present invention, the over-relaxation is concentrated in those nodes where the greatest movement occurs. This significantly speeds up the computation time.

A novel aspect of the invention is the conditioning of the model. In the real world, the interpretation of the subsurface structure starts with observations of large scale fracturing and faulting. In one aspect of the invention, based upon the observed large-scale deformations, the user derives an initial geometry of the unfaulted material. Since it is clearly desirable that the end result of applying stresses to the model should at least duplicate the observed large-scale deformations, the model is weakened at the reconstructed fault positions so that upon application of the stresses, there will be a predisposition to produce the observed large-scale fractures and faults. The conditioning step is made easier in the present invention by use of the graphical user interface.

Another novel aspect of the invention is the use of an "anticipate" step to get a quick solution to the deformation. The anticipate process is particularly useful in the definition of the deformation that is applied to the model. It is also useful in the conditioning of the initial trial model: comparison of the output of the anticipate step with the actual observed deformation serves as a check on the initial model. If the agreement is reasonable, then the initial trial model is used. If, however, the agreement is not good, a different initial trial model is used.

Nodes may be interconnected to nearest neighbors and next nearest neighbors by springs with an associated force. Alternatively, nodes may be interconnected by means of rods; in such a model, the forces are associated with changes in the angle between adjacent bonds.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE INVENTION

An Overview of the Invention

Figure 1:
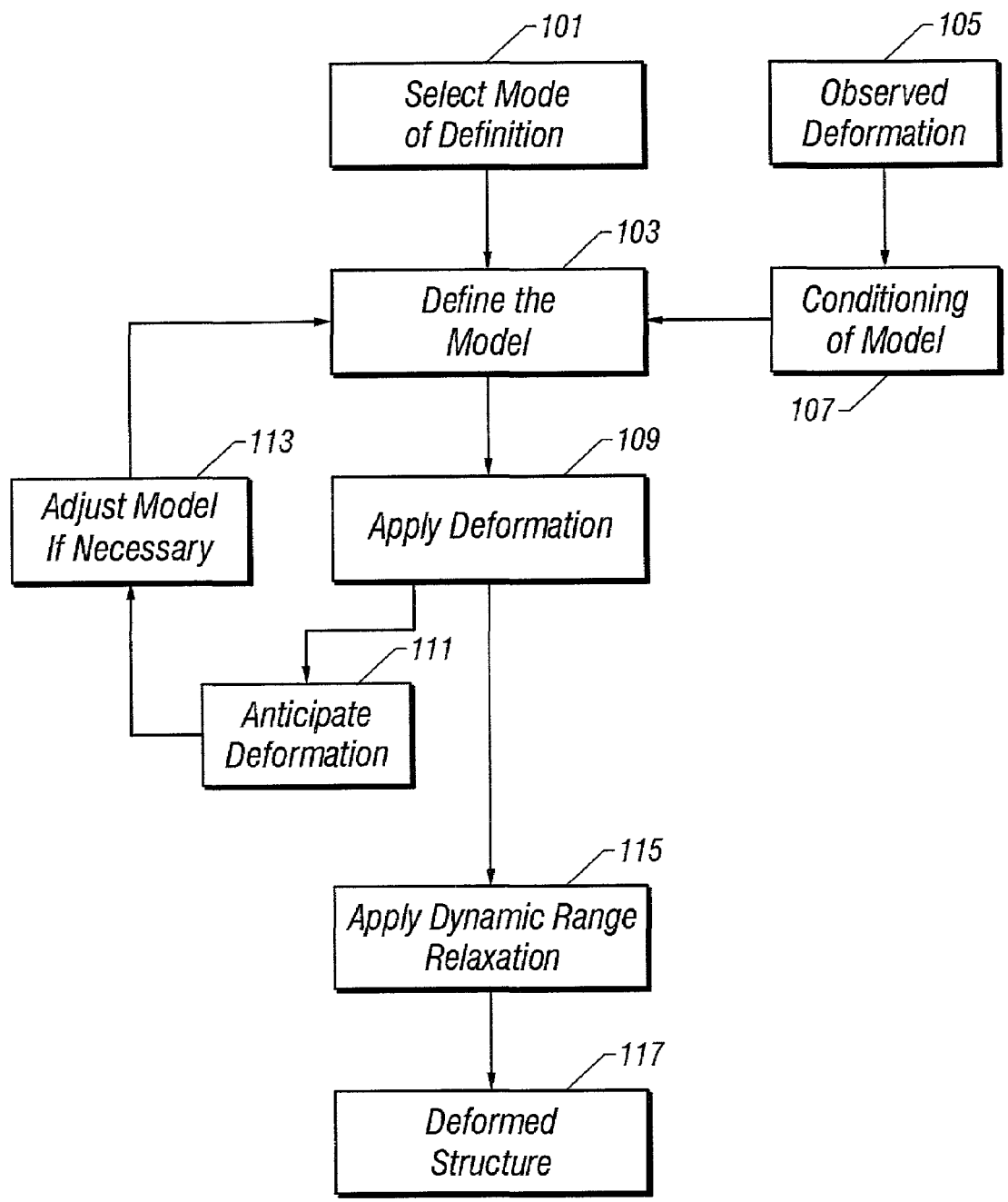
FIG. 1 is a flow chart of the important steps of the invention.

Turning now to FIG. 1, a flow chart of the major steps of the present invention is depicted. The first step in the invention is to select a mode of definition of the subsurface 101. This is described further below in reference to FIGS. 2a–2b. This step defines the boundaries of the model and the nodal configuration therein. The mode of definition may be aerial, cross-sectional or 3-D. Within the model, a plurality of interconnected nodes that characterize the geometry of the model are defined. In a preferred embodiment of the invention, the nodal pattern is a regular triangular lattice, although other patterns, such as a random lattice, may also be used. The user may also specify the number of nodes in and the aspect ratio of the model. This is conveniently done using the GUI. The GUI is discussed below in reference to FIGS. 6–13.

Within the framework of the nodal geometry defined at 101, the material properties of model are input 103. The nodes are interconnected by either springs (bonds), beams, or rods having elastic properties and breaking strengths related to the physical model. In a preferred embodiment of the invention, the springs are linear elastic springs. In an alternate embodiment of the invention, any user-specified stress-strain curve may be used. The user may also specify independently a repulsion between the nodes. In the beam model, the force is based upon linear beam equations of standard elastic theory. In the rod model, there is an angular force determined by the angle between links between nodes. The purpose of these forces (spring, beam, or rod) is to stabilize the matrix involved in the solution of the deformation process. Also input is the optional conditioning of the model (discussed below with reference to 107). The model definition and the conditioning are carried out using the GUI.

In one embodiment of the invention, the forces act between adjacent nodes (nearest neighbors). In an alternative embodiment of the invention, the forces act between additional nodes that are farther away, i.e., between next nearest neighbors or even further neighbors. Again, the addition of forces between next nearest neighbors is to stabilize the solution matrix. In a preferred embodiment of the invention, the next nearest neighbor forces are used in conjunction with the spring model, though the next nearest neighbor forces could also be used with the beam model or the rod model.

Once the model has been defined, the deformations are applied to the model 109. The result of deformation is to produce a deformed model with faulting and fracturing therein. This determination of the deformation process is carried out using a Dynamic Range Relaxation model 115 that is discussed in further detail below. The resulting deformed structure 117 from the model simulates the geological processes that occur in the real world and may be analyzed by those versed in the art to determine reservoir characteristics for a hydrocarbon reservoir and used in a development program.

Those versed in the art would recognize that the full-fledged numerical simulation is computationally expensive. There are no guarantees that the end result 117 will actually have the major features that are actually observed in the real world. In one aspect of the invention, an Anticipate process 111, discussed below, is used to provide a quick and dirty look at the possible outcome of the applied deformations 109. Based on an examination of the output of the Anticipate process, the model and the applied deformations may be adjusted 113 if necessary.

Another aspect of the invention is a conditioning process. The geologic interpretation process starts with the final position of the faults, and, in particular, the large-scale faults 105. These could be observations of surface faulting, as well as faults interpreted from the wellbore. It is essential that the deformed structure 117 include in it at least these large scale faults. Usually, the initial model is obtained from basic principles that would be familiar to a structural geologist. The observed fault structure is "undeformed" by reversing the process that produced the faulting in the first place. This is entirely a kinematic procedure that repositions the various fault blocks consistent with the laws of gravity and conservation of mass to the initial position they must have been in before the deformation started. This process is sometimes referred to as palinspastic reconstruction. Application of deformation to the Fram View model usually results in the observed large-scale deformation. However, in some cases this may not be enough. In such cases, the conditioning of the model is carried out. In the conditioning process, the model is weakened at the reconstructed fault positions so that after deformation of the model, fracturing and faulting are more likely at these positions. This is discussed below in the section on "Conditioning the Model."

The graphical user interface plays in important role in all of these steps. It is used in defining the nodal structure of the model, the strengths of the bonds between the nodes, the specification of the stresses, the display of the deformed structure and in the conditioning process. This is described below in reference to FIGS. 6–13.

The Model Definition

Figure 2A:
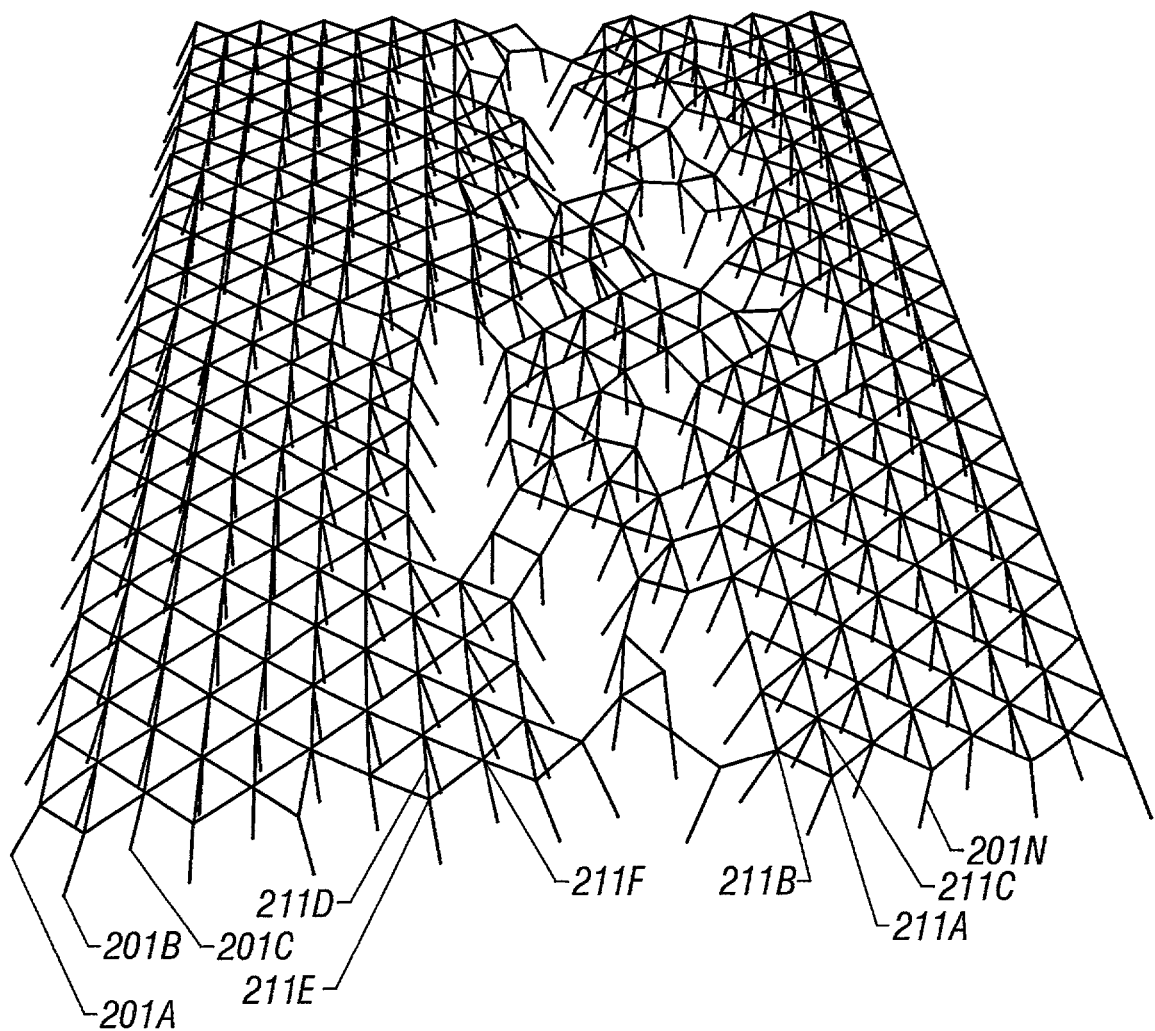
FIGS. 2a–2b show the triangular nodal configuration for the aerial and 2-D of the model.

Turning now to FIG. 2a, an aerial model is depicted. In the picture above, two sets of nodes are shown. The lower plane is a set of nodes 201a, 201b, 201c . . . 201n called the "substrate". The upper plane consists of the nodes 211a, 211b, 211c . . . 211f that make up the material itself. In one embodiment of the invention, called the nearest neighbor model, a line is drawn connecting each of the nodes in the material with its neighboring nodes. These lines represent springs (or bonds), beams, or attractive forces between the nodes. Note that there are two sets of springs. One set is in the plane of the nodes; the other extends down to one of the nodes in the substrate. In a way, this picture is incorrect, because the actual model is really only two-dimensional. The entire model lies in a plane, so that the substrate nodes are not really below the material nodes, but instead lie in the same plane with the material nodes. In an alternative embodiment of the invention, forces are introduced not only between nearest neighbors but also between next nearest neighbors. This is discussed below in [0039].

To deform the material, the substrate nodes are moved according to deformation arrows defined in the model interface. In the aerial mode, deformation arrows (not shown) can be applied at any point in the substrate. These are applied in a point and click manner. In order to specify the deformation between the user input arrows, an Anticipate calculation (described below) is done to map the specified deformation arrows to every point in the substrate. As the substrate nodes are moved, the material nodes are "pulled along" and are separated from each other. As part of the model definition, a distribution of breaking strengths is defined in the interface. In a spring model, the distribution of breaking strengths has an equivalent distribution of breaking lengths. Hereafter, the two terms may be used interchangeably. From this distribution of breaking lengths, a breaking distance has been assigned to each spring. If the length of any spring exceeds its breaking distance, that spring is broken and is never re-attached. The distribution of breaking lengths is assigned by giving a mean and the standard deviation of the breaking distances. A random number seed is used to choose one breaking length from the distribution for each spring on the spring network. As soon as the length of a spring connecting two nodes exceeds its breaking length, the spring breaks. By changing the random number seed, a number of realizations can be made from the same breaking distribution.

Optionally, the anticipate function, described below, allows the user to see what the deformation of the boundaries and a rubber sheet would look like without any breaks. This use of the anticipate function as a screening tool allows accurate definition of the deformation arrows.

The software in the user interface is capable of reading in pictures in .gif format and resize them to help position deformation arrows, in the definition of the material properties and in conditioning the model. This makes it possible for the user to trace results from a scanned picture or file directly into the interface.

Preexisting fractures or faults can be added using the interface. Preexisting faults or fractures are added by drawing line with the interface. Material regions can be defined within the material. Within these material regions, the distribution of breaking thresholds, spring constants, repulsion and substrate attachment may be defined by using the interface. This allows the modeling of a wide range of earth materials, from the very ductile to very brittle rocks.

Figure 2B:
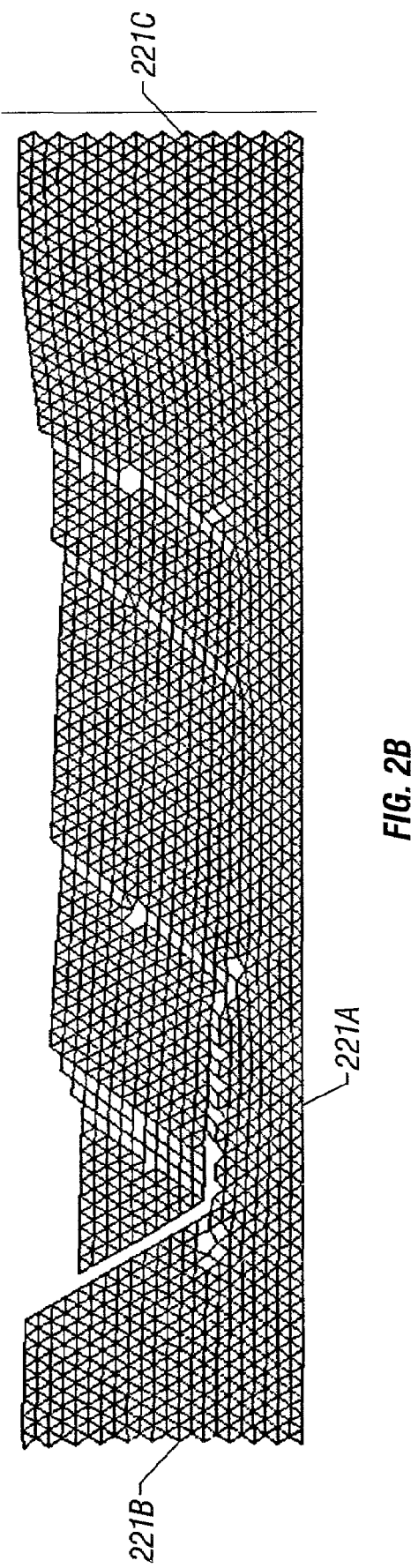

In the cross-sectional mode, the same features are available as for the aerial mode. In addition, the model includes the effect of gravity. An example of a cross-sectional model is shown in FIG. 2b. The substrate attachment is limited to the sides and bottom of the material. As the name implies, in the cross-sectional mode, the model is a vertical cross section of the subsurface of the earth.

In the 3-D mode, the same invention has the same capabilities as in the cross-sectional mode. In a preferred embodiment, the nodes are in a triangular configuration and the connection between the nodes is by means of springs. This reduces the computational time compared to other arrangement of nodes and beam connections between the nodes. The deformation may be applied to the bottom and four sides of the volume of the material region.

For two dimensions, the nodes are represented by discs, and for three dimensions, the nodes are represented by spheres. The discs or spheres have a characteristic radius $r_j$. The elastic elements between the nodes are modeled by elastic springs with an equilibrium length $l_{i,j}$ that corresponds to the sum $r_i+r_j$. The forces acting on the node i can be decomposed into the following:

| | |
|---|---|
| $\vec{f}_{i,j}^n$ | normal force from node j |
| $\vec{f}_i^0$ | substrate attachment force |
| $\vec{f}_i^a$ | boundary attachment force |
| $\vec{f}_i^e$ | external forces |
| $\vec{f}_o^p$ | force from salt pressure. |

The normal force has the form $$\vec{f}_{i,j}^n = k_{i,j}(|\vec{x}_i - \vec{x}_j| - l_{i,j})\vec{u}_{i,j} \qquad (1)$$

where the vector $u_{i,j}$ points from the center of node i to the center of node j. On a macroscopic scale, the spring constant $k_{i,j}$ is related to Young's modulus $k_{i,j}=Ew$ where w is the thickness of the disks in a 2-D model. For practical purposes, the equations are rescaled with a length l corresponding to a typical internode distance, and with a spring constant k corresponding to a typical spring constant. The corresponding equation is then $$\vec{f}_{i,j}^n = \kappa_{i,j}(|\vec{x}_i - \vec{x}_j| - l_{i,j}/l)\vec{u}_{i,j} \qquad (2)$$

where all lengths are measured in units of l and $\kappa_{i,j}=k_{i,j}/k$. In one embodiment of the invention, repulsive forces are included and a similar repulsive force acts between all particles in contact with each other. Generally, the force constants for attraction and repulsion need not be identical. The force constant for repulsion is denoted by $\kappa_{i,j}^r = k_{i,j}^r/k$.

The substrate attachment force has the form $$\vec{f}_i^0 = \kappa_i^0[\vec{x}_i - \vec{x}_i^0] \qquad (3)$$

The positions $$\vec{x}_i^0$$

of the substrate attachment points are displaced along with the substrate and impose the boundary interactions on the elastic elements.

The boundary attachment force has the same form as the internode attachment. The spring constant for this connection is separately specified and is related to the elastic coefficients of the boundaries. Boundary interactions are always repulsive, but may additionally include attractive interactions. Boundary conditions are discussed below.

The preferred embodiment of the invention includes, optionally, gravity or externally imposed forces such as the addition of an overburden pressure. These forces are discussed below.

Deformations are imposed on the simulated material from the boundary conditions. These deformations are input into the model via arrows drawn on the interface at user specified locations. These input deformations are "interpolated" between the user specified arrows using the anticipate function results along the boundaries (or substrate in the aerial model). This defines the movement of every boundary node. When the dynamic range relaxation algorithm is run, each boundary point is moved from its initial (t=0) to its final (t=1) position in small steps δt At each time step, the lattice is relaxed according to the dynamic relaxation algorithm. If any spring supersedes (i.e is equal to or greater than) its maximum elongational force $f_{i,j}^c$ it is irreversibly removed from the lattice and the equilibrium configuration recomputed (i.e. the spring or bond is broken, or removed). Only one spring is removed each iteration, and the spring that exceeds its threshold the most is broken first. When no more springs are broken, the deformation is propagated another time step and the process is repeated.

The spring model provides sufficient shear stiffness in an unfractured, triangular lattice in which each node has 6 neighbors. However, for a randomly generate lattice, the average number of connected neighbors is less than 6, and a spring lattice becomes unstable under shear. When the material is deformed, internal regions may respond by rotation, which produces a material with a very low coefficient of elasticity.

Figure 2C:
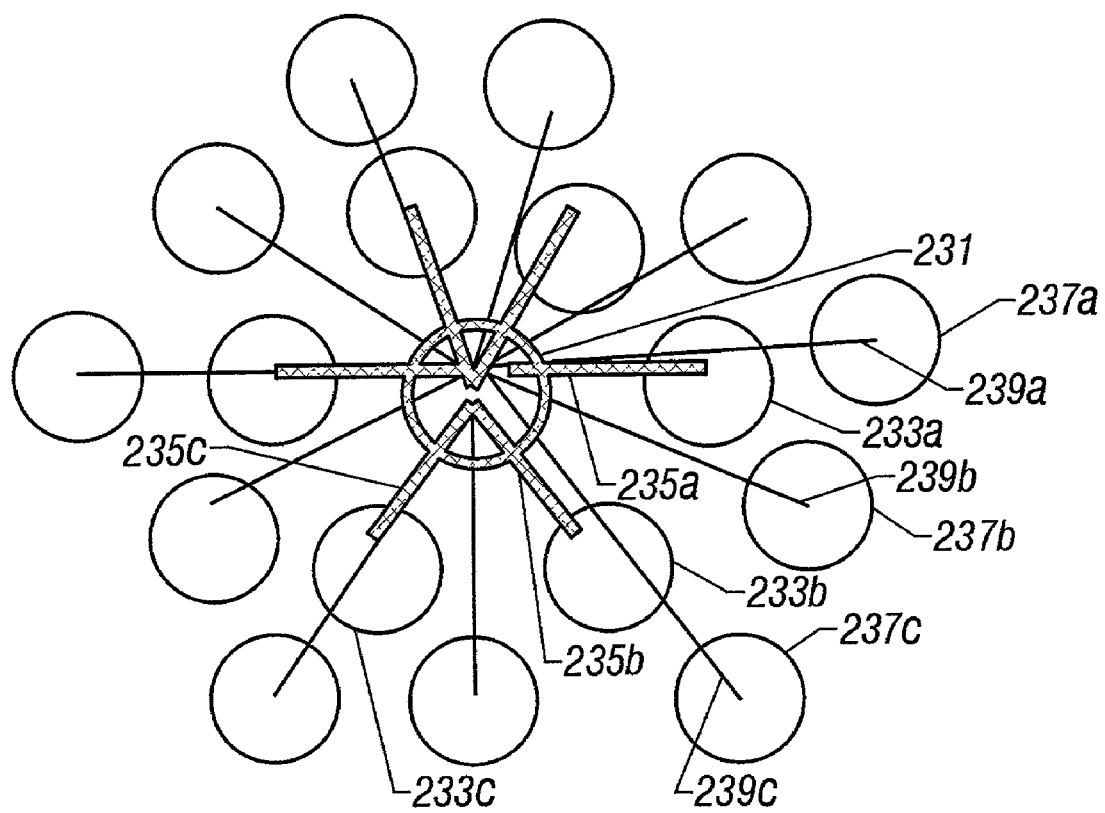
FIG. 2c shows the connection of a node to its nearest neighbors and its next nearest neighbors

In order to prevent this, an alternate embodiment of the invention includes linkages between nodes that are not nearest neighbors. This is illustrated in FIG. 2c Shown therein is a reference exemplary node 231 with nearest neighbors (NNs) denoted by 233a, 233b, 253c . . . Forces between the NNs are denoted by the thin lines 235a, 235b, 235c . . . In addition, next nearest neighbor nodes of 231 are denoted by 237a, 237b, 237c . . . with corresponding forces denoted by 239a, 239b, 239c . . . In a preferred embodiment of the invention, the orderly breaking of the nodes in the next NN model is accomplished using the same rules as in the NN model, i.e., a value is drawn from the user supplied distribution of breaking thresholds for the next NN springs just like for the nearest neighbor springs. In an alternate embodiment of the invention, different distributions of breaking thresholds are set for the nearest and next nearest neighbor springs.

Figure 3A:
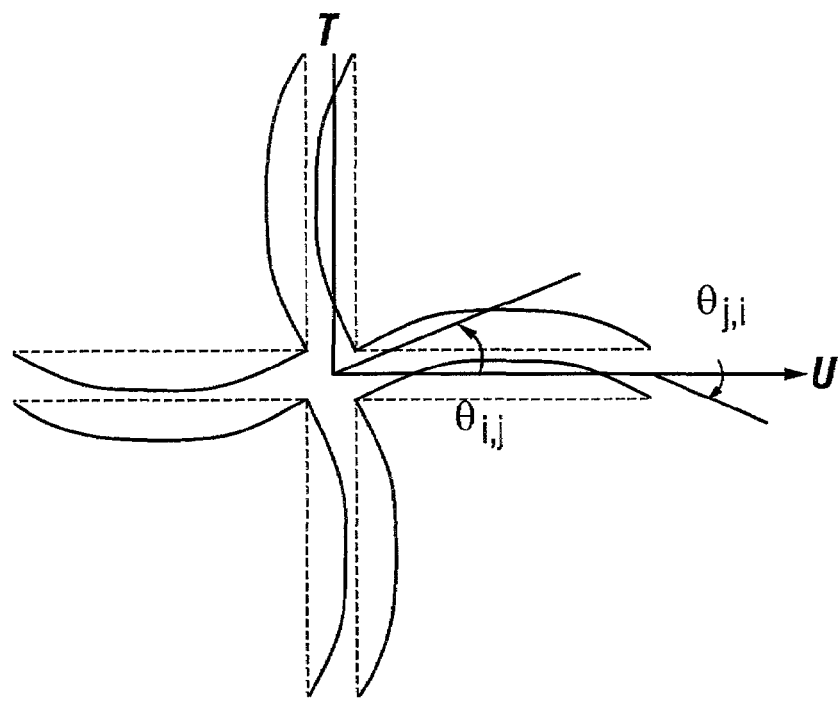
FIG. 3a illustrates some of the parameters required for a beam model.

Another alternate embodiment of the invention performs the stabilization by including beams connecting the nodes of the NN lattice. FIG. 3a is an illustration of 4 beams connecting a node to adjacent nodes (not shown) and the sign convention for the rotation angles associated with the beams. All the beam attachments are assumed to move stiffly with the beam.

The linear, normal force $$\vec{f}^n_{i,j}$$

has the same form as for the spring connection.

In addition, there is a shear force $$\vec{f}^s_{i,j}$$

acting on node i due to the beam connection with node j.

$$\vec{f}^s_{i,j} = \frac{1}{2} \frac{1}{2(1+v) + \frac{Al^2_{i,j}}{12I}} \{\theta_{i,j} + \theta_{j,i}\} \vec{t}_{i,j} \quad (4)$$

where v is the Poisson's ration, I is the moment of inertia of the cross-section of the beam around the center of the beam and A is the area of the cross-section of the beam. For a rectangular cross section of width w, corresponding to cylindrical particle of width w, the moment of inertia is $I=a^3w/12$ where a is the width of the beam, and the area is $A=aw$. The shear force may therefore be expressed in terms of a instead of I $$\vec{f}^s_{i,j} = \frac{1}{2} \frac{1}{2(1+v) + \left(\frac{l_{i,j}}{l}\right)^2 \left(\frac{l}{a}\right)^2} \{\theta_{i,j} + \theta_{j,i}\} \vec{t}_{i,j} \quad (5)$$

In eqs. (4) and (5), $$\vec{t}_{i,j}$$

is a unit vector pointing in the direction of the shear force on the i-th particle, as indicated in FIG. 3a.

For convenience, a shear force constant $k_s$ may be defined as $$k_s = \frac{1}{2} \frac{1}{2(1+v) + \left(\frac{l_{i,j}}{l}\right)^2 \left(\frac{l}{a}\right)^2} \quad (6)$$

The moment about the disc center I due to the bent beam connected to node j is $m_{i,j}$ $$m_{ij} = \frac{1}{2(1+v) + \left(\frac{l_{i,j}}{l}\right)^2 \left(\frac{l}{a}\right)^2} \left\{ \left(\frac{l}{l_{i,j}}\right)^2 2(1+v) \frac{1}{12}\left(\frac{a}{l}\right)^2 (\theta_{i,j} - \theta_{j,i}) + \frac{1}{2}\left(\frac{2}{3}\theta_{i,j} + \frac{1}{3}\theta_{j,i}\right) \right\} \quad (7)$$

The prefactor of the first angular term may be defined as $$\gamma_{i,j} = \left(\frac{l}{l_{i,j}}\right)^2 2(1+v) \frac{1}{12}\left(\frac{a}{l}\right)^2 \quad (8)$$

In a preferred embodiment of the invention, the Poisson's ratio lies between 0 and 0.5 while a lies between 0 and 1.

Simulations of the beam model are performed in an analogous manner to those of the spring model. The points defining the boundary conditions are displaced in small steps from the initial to the final positions, and at each step, the equilibrium configuration is found for the lattice. However, the beams may break either due to tensional or shear stress, and the rotational aspects of the node motion must be included in the relaxation algorithm.

Figure 3B:
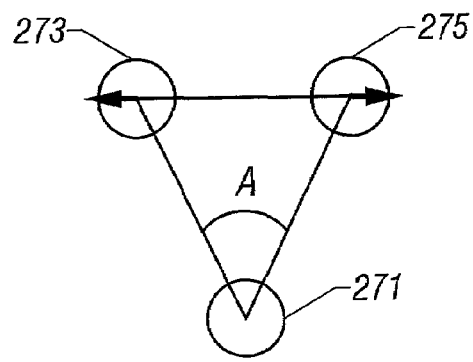
FIGS. 3b–3d shows forces in the rod model.

Another method of stabilization is based upon the angle between rods linking the nodes. This is shown in FIG. 3b where three nodes 271, 273, and 275 are shown. There is an angle A between the two links of node 271. Given a decrease in the angle A, forces act on nodes 273 and 275 as indicated by the arrows that would tend to increase the angle A. The forces are reversed in direction of the angle A is increased. In a preferred embodiment of the invention, these forces are proportional to the change in the angle; however, any other functional relationship between the forces and the change in the angle may be used. In FIG. 3b, only the forces resulting from a change in the angle A are shown. In general all of the angles in adjacent nodes will change and groups of forces will be generated associated with the change of each angle.

Figure 3C:
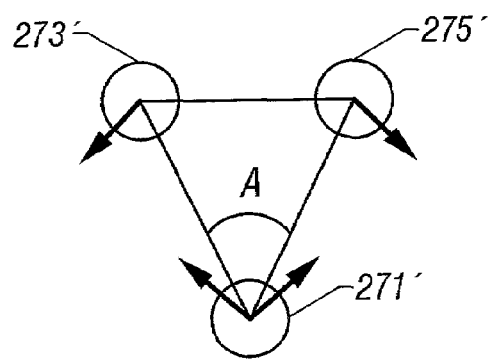
Figure 3D:
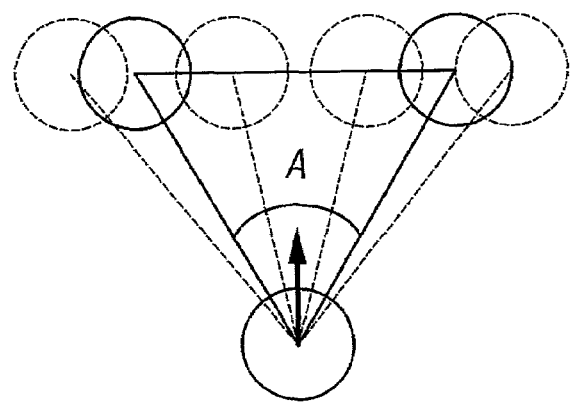

Alternative forces that may be generated are shown in FIG. 3c and FIG. 3d. The force vectors in FIG. 3c are perpendicular to the lines connecting the centers of the nodes. The direction of the force vector near 275' is to restore the angle A (in this case A is decreasing). In order to keep the sum of the forces zero, an equal and opposite force is applied at 271'. A similar pair of forces is also applied with the same reasoning to produce the force near 273' and the second force on 271'. The upward arrow in FIG. 3d shows the restoring force on the node A if the angle at the node is decreased.

Dynamic Range Relaxation

Referring again to FIG. 1, the step of Dynamic Range Relaxation 115 is discussed. As noted above, the present invention includes a modified Distinct Element Model (DEM). In DEMs, the rock is modeled as a network of distinct elastic elements connected by elastic connections to its outer boundaries. The boundaries are deformed in small steps, and the force equilibrium configuration is found for each step. The spatial resolution of the prediction depends on the size of the model system measured in units of distinct elements used. The main limiting factor for the practical application of such models to the geologic problems of interest is the long computer time needed to find force equilibrium.

Numerous methods exist for the solution of relaxation problems or minimization problems. The problem of finding a force equilibrium is equivalent to a minimization problem since the corresponding elastic energies associated with forces acting on the nodes of a lattice must be minimized to find the force equilibrium configuration. Prior art methods use a brute force solution to the problem at a high computational cost. The computational times for prior art methods, such as conjugate gradient methods, is proportional to $L^4$ where L is the length of a side in the network measured as the number of distinct elements.

A more direct approach to the problem is over-relaxation: this is also a standard method for solution of minimization problems. In over-relaxation methods, equilibrium is reached by moving each node a distance proportional to the forces acting on the node. The constant of proportionality is called the over-relaxation constant, and optimal choices for it exist. (Allen 1954). In each relaxation cycle, each node is moved, and the relaxation cycles are repeated until no node is moved farther than a threshold distance, termed the relaxation threshold. Generally, over-relaxation methods require a number of computations of the same order as a conjugate gradient method.

In damped relaxation methods each node is given a mass and a damping force is associated with each spring. The solution for the overall system is found by numerical integration but the overall computation time is not significantly less than for conventional over-relaxation methods. Some prior art methods have speeded up the relaxation. For example, in block relaxation methods, blocks of many nodes are moved as a rigid body a distance proportional to the net sum of forces acting on the boundaries of the block.

In the present invention, a modified relaxation scheme is used for solving the deformation problem. As noted above, the system to be solved comprises a network of nodes connected by elastic connections. The connections may be of any type and may be represented by any force law. As noted above, they can be springs, bending beams, or rotating rods. Those versed in the art would be familiar with using the method of the present invention to other types of elastic connections between the nodes of the model.

The force $f(x_i, x_j, q_{i,j})$ acting on a node i at position $x_i$ due to contact with node j depends upon the position of node j, $x_j$, and additional variables $q_{i,j}$ related to the relative configuration of the two nodes, such as their relative angle of rotation about any axis. The net force acting on node i is then given by an equation of the form $$F_i = \sum_j f(x_i, x_j, q_{i,j}) \tag{9}$$

This includes all the forces discussed above with reference to eq. 1–8. In the present invention, an over-relaxation technique is used on the set of eqs. (9). However, the over-relaxation is concentrated in the region of the model where movement occurs using the following method.

The method of the present invention combines the basic Dynamic Range Relaxation Algorithm (DRRA) with steps that include fracturing and faulting. This is a novel aspect of the present invention. Prior art techniques, such as finite elements method do not involve the breaking of bonds when the deformation exceeds a prespecified deformation limit. Cundall has disclosed a damped method in which fracturing does occur. However, as noted elsewhere, conjugate gradient methods, damped relaxation methods, and finite element methods require much larger computation time than does the present invention. In the present invention, displacements are applied to the boundaries of the model.

Figure 3E:
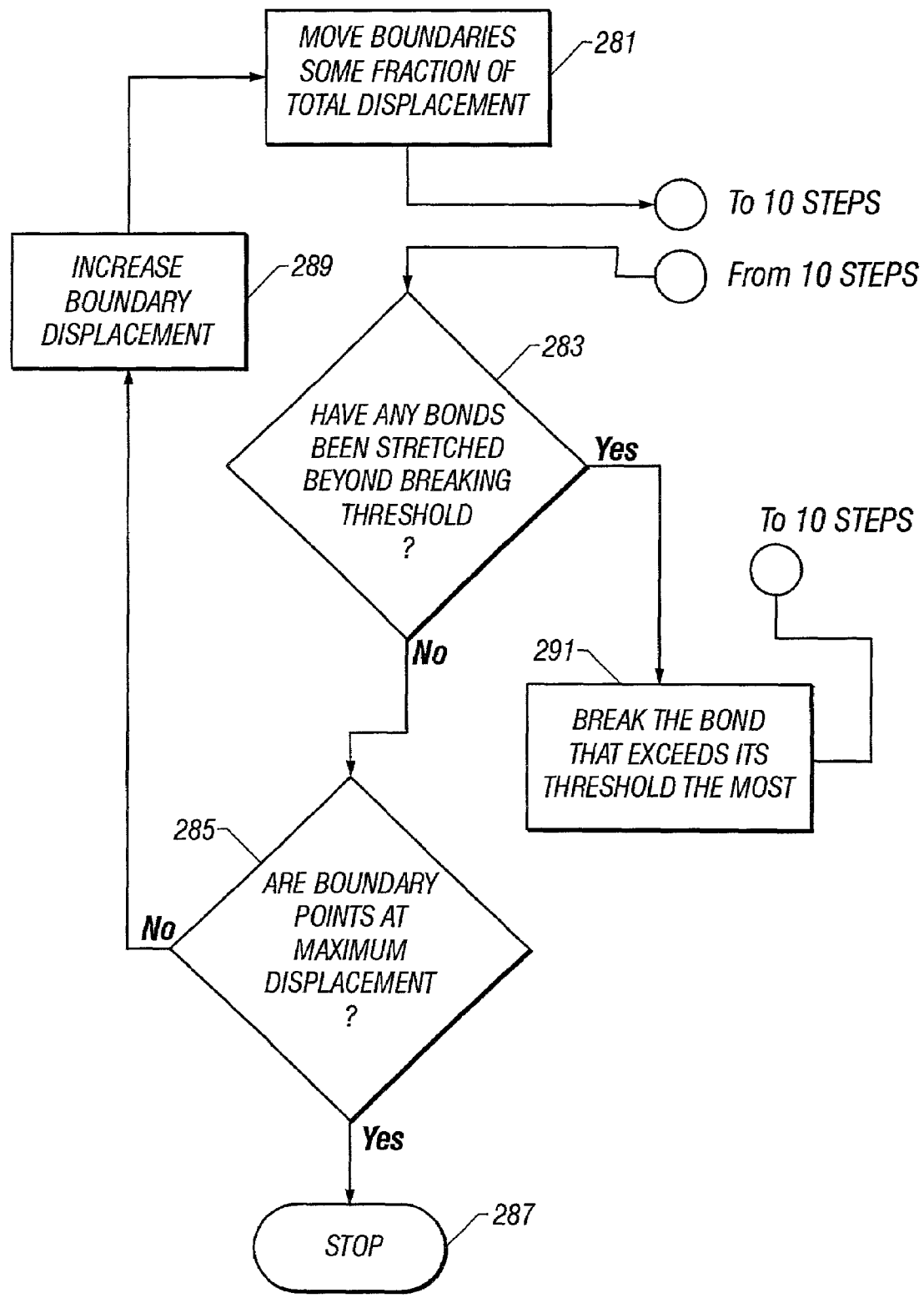
FIG. 3e illustrates the steps by which the deformation process is carried out and the bonds in the model are broken.

Turning now to FIG. 3e, initially only the boundary points of the model are moved a prespecified fraction of the total displacement to be applied 281. In a preferred embodiment of the invention, this fraction is 0.001. After this application of partial displacement of the boundaries, the DRRA given in the following list is carried out.

1. All nodes are relaxed according to a single over-relaxation step.
2. All nodes that move further than the relaxation threshold are added to a list A.
3. If list A is empty, that is, no nodes have moved further than the relaxation threshold, move to step 10.
4. The nodes in list A are relaxed sequentially with a single over-relaxation step each.
5. If the displacement of a node exceeds the relaxation threshold then this node and all the nodes it interacts with are added to a list B.
6. Each node is only added once to list B.
7. When all nodes in list A have been relaxed, lists A and B are interchanged.
8. If list A is non-empty (that is, at least one node has been moved further than the relaxation threshold $\epsilon$), return to step 4.
9. Return to step 1.
10. End.

A check is then performed to see if any of the bonds have exceeded their breaking threshold using criteria described below 283. If no bonds have exceeded their breaking threshold, a check is made to see if all the boundary points are at their maximum displacement 285. If the answer is yes, then the simulation is complete and the process stops. If, however, the answer at 285 is "NO", then the displacement of the boundary points is increased 289 and the process repeated starting at 281.

If the answer at 283 is "YES", i.e., some bonds have exceeded their breaking point, then only the bond that exceeds its breaking threshold the most is broken 261 and the method proceeds to the DRRA discussed above. The process illustrated in FIG. 3e will stop when no more bonds are being broken and all the boundary points are at their maximum displacement.

For the case of models that include salt, the method is modified slightly. If one node that belongs to a salt boundary is displaced, that information is propagated via the pressure to all the other nodes along the salt boundary. All the nodes along the salt boundary must therefore be added to list B if a node on the salt boundary is displaced further than the displacement threshold. Those versed in the art would recognize that a node may interact with more nodes than it is connected to, because repulsive interactions may be present between non-connected modes. Accordingly all interacting nodes should be added to list B if a node is displaced further than the relaxation threshold.

For the problem of fracturing and faulting in the present invention, this relaxation method is significantly faster than prior art methods mentioned above. For example, in two dimensions, the number of computer time steps for solving the system is proportional to $L^{1.3}$. This compares with a number of time steps for a conjugate gradient scheme of $L^4$. A model with size L=500 typically takes 1.2 hours to run on a HP-735Ò MkII workstation. A comparable conjugate gradient solution would take hundreds or thousands of hours.

Boundary Conditions

An important aspect of the present invention is the application of deformations. Deformations are imposed by the boundaries; however, the imposition of the interactions depends upon the mode of definition.

For the aerial mode, the deformation is imposed by the movement of the supporting substrate. Each node i of the 2-D network is attached to a corresponding substrate attachment point. Initially, the node position and the substrate attachment point are coincident. The attachment between the nodes and the substrate attachment point is modeled as a weak spring $$\vec{f}_i^0 = \kappa_0(\vec{x}_i - \vec{x}_i^0) \tag{10}$$

where $\kappa_0$ is the spring constant for the node-substrate coupling relative to the internode spring constant.

A similar torque attachment is used in addition to the linear spring for the aerial beam model, to localize the propagation of rotations. In the beam model, a moment $m_i^0 = -k_{s0}\phi_i$ acts on each node attached to the substrate where $\phi_i$ is the angular rotation of node i.

Cross-sectional and 3-D simulations handle boundary conditions differently. Boundary conditions are specified along the outer boundaries of the material only. The boundaries are modeled as particulate walls of discs or spheres. These boundary particles interact with nodes in the material through unbreakable linear springs and repulsive forces. In a preferred embodiment of the invention, the boundary conditions are exactly the same as the conditions within the material for both the rod and next NN model. The material and boundary nodes are connected together with rods for the rod model and with springs for the nearest and next nearest neighbors. For the next nearest neighbor model, the user inputs two numbers: 1) a value to define the distance to the nearest and 2) a value to define the distance to the next nearest neighbor nodes. (e.g. if the nodes are 1 unit in diameter, the first value input might be 1.01 and the second value might be 1.6 for example. Then if a node center were less than 1.01 distance from its neighbor, it would be considered a "nearest neighbor"; if a node were greater than 1.01 but less than 1.6 units away it would be considered a next nearest neighbor.) And it does not matter if the nodes found this way are material or boundary nodes, the attachments, breaking thresholds, etc., are all assigned the same way. It would be possible to build a model where the attachment to the boundary nodes were different than the attachment to the material nodes.

Figure 4A:
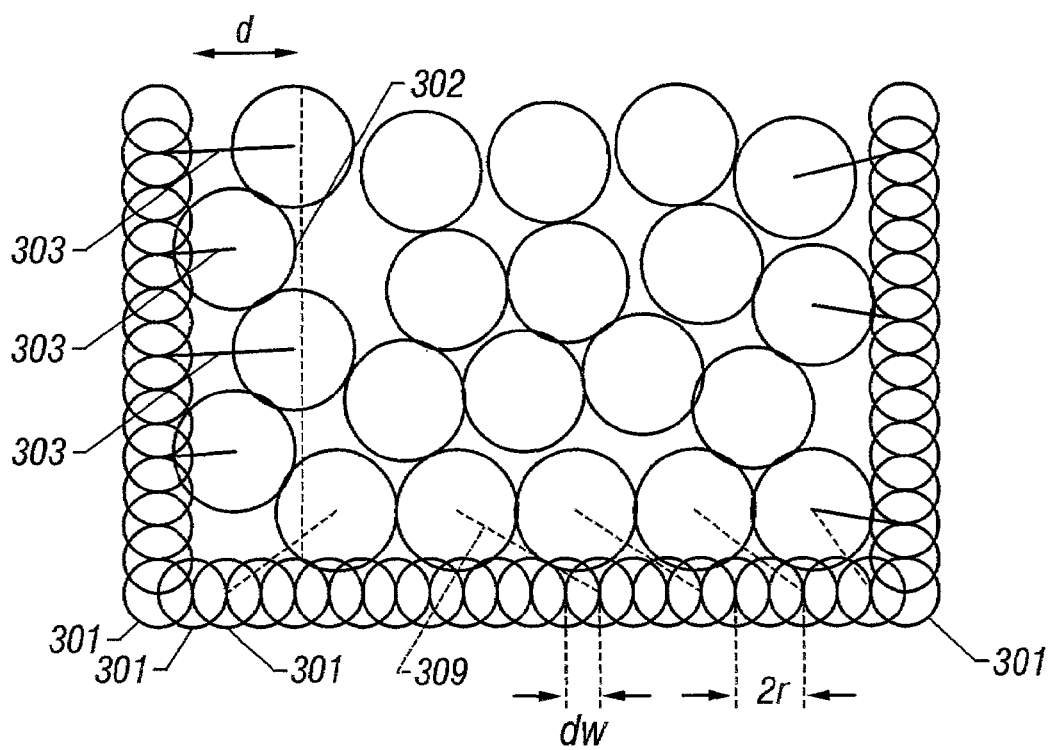
FIGS. 4a–4c show the manner in which boundary conditions are handled in the invention.

Referring now to FIG. 4a, particles (discs or spheres) 301 are lined up along the boundaries. The particles 301 have a diameter $2r_w$ and are spaced a distance $d_w$ apart where $d_w$ is less than $r_w$. All material particles 302 (particles here referring to a region surrounding a node) within a distance d of the boundary are attached to the nearest wall particle by an unbreakable spring 303 having a spring constant $k_w$. As per the convention adopted above, this spring constant is normalized relative to the internode spring constant. In addition to the attractive interaction from such springs, repulsive forces act between all overlapping material particles and wall particles. A strong repulsive force is maintained between the wall particles and the adjacent material particles.

During deformation, the walls may be stretched locally. The present invention includes a step for avoiding the possibility of material particles passing through the wall without interaction. This step is implemented prior to applying the dynamic relaxation algorithm to the internal nodes. The steps for cross sectional simulations are as follows:

1. The initial boundaries are filled with a constant spacing $d_w$ is illustrated in FIG. 4a. This generates a sequence of discs at positions $$\overline{x}_k$$

for k=1, 2, . . . N.

2. The boundary discs are displaced to their final positions at the end of the deformation.

3. The distances between adjacent wall particles are measured. If the distance between wall particle k and particle k+1 exceeds $d_w$, new particles are inserted along the line between $$\overline{x}_k$$

and $$\overline{x}_{k+1}$$

in the initial configuration in order to make the separation no greater than $d_w$ in the final configuration.

4. Repeat steps 2 and 3 until no further particles need to be added. It is important to repeat steps 2 and 3 several times, because the newly entered particles may be displaced into different positions than what was assumed when the wall particle distance was calculated in step 2.

Figure 4B:
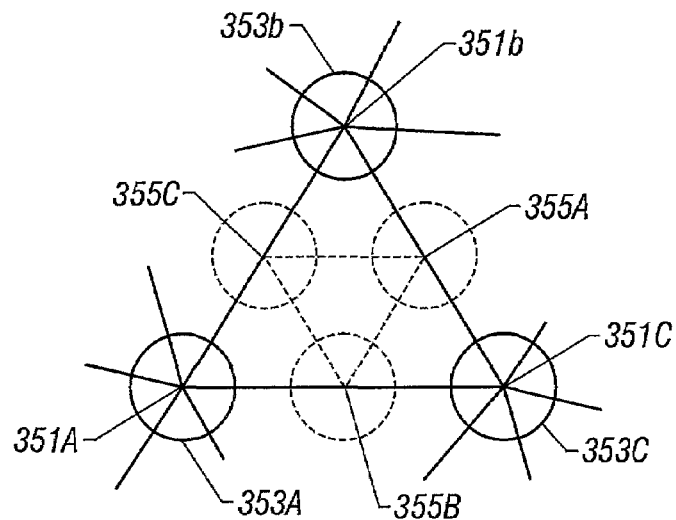

A similar technique is used for defining particle walls in 3-D models. For the 3-D case, the process of iterative particle placement has to be modified to fill the wall areas with a sufficiently large density of wall particles. This technique in 3-D is defined as follows:

Turning now to FIG. 4b, initially, the wall is represented by a set of triangles such as 351a, 351b, 351c. Associated with each vertex of the triangle is a particle, i.e., 353a, 353b and 353c. The iterative refinement procedure for filling in the triangle follows the steps given here:

1. For each triangle in the set of triangles, the maximum distance between any two vertices is measured. If this maximum distance exceeds the placement threshold $d_w$, the triangle is subdivided into 4 smaller triangles by the points 355a, 355b and 355c.

2. At each vertex in the subdivision, a wall particle is placed. However, there may already be a wall particle in this position due to subdivision of a neighboring triangle. Accordingly, duplication must be resolved.

3. The newly defined triangles are added to the set of triangles and the original triangle is removed from the list. Step 1 is repeated until no more triangles need to be subdivided.

4. The boundary nodes are then moved to their final positions. Steps 1, 2, and 3 are repeated. With the new set of nodes Step 4 is repeated until no more triangles are added.

Once enough nodes have been added so that internal nodes will no longer pass through the boundary nodes, the relaxation algorithm is run using all of the boundary nodes in both the original definition plus all those added in order to keep internal nodes from passing through the boundary nodes.

Material Properties

Material properties include the elastic coefficients of the material, the material density, and the breaking strength of the material. Material properties are defined for the global system, but may be modified for regions within the material. In the general force equilibrium equations, the values of the spring constant and the typical size of a bond (spring or beam) are immaterial for the equilibrium configuration, but are essential for the interpretation of the stresses and strains in terms of physical quantities. All forces calculated in the rescaled model must therefore by multiplied by Ewl in two dimensions and by $El^2$ in three dimensions.

Local variations of the elastic coefficients are handled by changing the local values of $k_i$, the spring constant for node i, as explained above. The values $k_i=1$ implies that the Young's modulus for node i is the same as the overall Young's modulus. The simulation model allows the overall spring constant k to be changed to a value other than unity but in the preferred embodiment, a value of one is used.

The distribution of breaking thresholds is used to tune the behavior of the material from a brittle material for a narrow distribution to a more ductile behavior for a wider distribution. The distribution incorporates the effects of different lithologies, the degree of consolidation, cohesion within the material, disorder, and the effect of varying strain-rates during deformation. The breaking threshold distribution provides the force $f_{i,j}^c$ for which a given spring will break. The values are drawn randomly from the distribution initially and do not change during the simulation. In a preferred embodiment of the invention, the distribution of breaking thresholds is a Gaussian distribution. In an alternated embodiment of the invention, the distribution is a Weibull distribution. For the aerial model, comparisons between simulation experiments and physical model studies suggest that the Gaussian distribution with m=0.15 and s=0.05 provides a good match for several field cases.

For the beam model, an additional distribution of breaking thresholds is included in the present invention. For each beam, the threshold values $$m_{i,j}^c$$

are drawn from the moment threshold distribution. In a preferred embodiment of the invention, a single Gaussian distribution is used to describe the full range of lithologies, inhomogeneities, and rate dependent effects. In alternate embodiments of the invention, a plurality of distributions is used and distributions other than Gaussian may be used.

Those versed in the art would recognize that the condition for the breaking of a beam depends upon both the normal force and the moment in the beam. In a preferred embodiment of the invention, a von Mises type breaking criterion is used. This requires determination of $$M = \max\left(\frac{f_{i,j}}{f_{i,j}^c}, \frac{m_{i,j}}{m_{i,j}^c}, \frac{m_{j,i}}{m_{j,i}^c}\right). \tag{11}$$

A beam breaks if M>1, and the beam with the largest value of M is broken first. The breaking of beams in the next NN model is handled in the same manner as the breaking of springs in the next NN model as discussed above in [0039]

The breaking thresholds may be changed for regions within the simulated material. For bonds extending beyond the boundaries of a region from particles within the region, the breaking thresholds are drawn from the distributions within the region. The definition of the regions depends on the dimensionality of the system.

In two dimensions, a region is defined by a closed loop around its boundary. The loop is defined as a piecewise linear curve, specified by the coordinates $\vec{x}_n$ for n=1, 2, 3 ... M., with the next point in the sequence after M being 1. A node at a position $\vec{x}_i$ is established to be either within or outside a region by angular integration (summing) of $\phi = \Sigma \phi_n$ where $f_n$ is the angle between $\vec{x}_n - \vec{x}$ and $\vec{x}_{n+1} - \vec{x}_i$. If f=k2p, the point is inside the closed curve and if f=0, the point is outside the closed curve. This procedure works independently of the orientation of the curve and how many loops it has. The procedure is repeated for all nodes in the material to check whether they belong to a particular region.

Establishing enclosure in 3-D is a more elaborate procedure. The most commonly used type of volumetric definition is based on triangulation of the enclosing surface. This would, however, require a significantly more elaborate user interface for the definition of bounded regions. The present invention includes a simpler approach to establishing closure in 3-D. The interface allows the user to define a material region. This is done by displaying a set of points in each of N horizontal planes in the interface (here N depends on the number of layers of nodes chosen in 3D). The set of points in each plane defines an area for that material region. The number of points in each plane is the same so that a volume can be defined by a linear interpolation between points in adjacent planes. The user may add or subtract points from any plane by pointing and clicking on a point in the interface. But points are added or subtracted in all of the planes at once, so that the number of nodes in each plane is always the same. So, for example, if a point is added in plane #2, a node is also added in planes 1, 3,4, ... , N. When complete, the input has defined a set of N planes, each containing M points. The enclosing surface for each plane, k, is defined by a set of closed loops $\{\vec{x}_{n,k}, n=1,2, \ldots M\}$. The set of loops traces out a surface for each k=1, 2, ... N. The number of points, M, must be the same along each curve and corresponding points in consecutive surfaces are linked together to form the surrounding surface.

During the material definition procedure, each particle is determined to be inside or outside the region based on a method similar to that used in two dimensions. Based on the z-position, $z_i$, of particle i, the enclosing curves above and below the particle i are found. A linear interpolation between the points along the two curves is used to determine the shape of the curve at the height $z_i$ of particle i. For two curves $\{\vec{x}_{n,k}\}$ with k=K and k=K+1, the linear interpolation is found from $$\vec{x}_{n,*} = \vec{x}_{n,K} c_n + \vec{x}_{n,K}(1-c_n) \tag{12}$$

where $c_n$ depends upon the vertical distance between the node i and the points $\vec{x}_{K,n}$ and $\vec{x}_{K+1,n}$;

$$c_n = \frac{z_i - z_{K,n}}{z_{K+1,n} - z_{K,n}} \tag{13}$$

Those versed in the art would recognize that among the commonly occurring subsurface materials involved in deformation, salt is unique in that over geologic time, it acts like a fluid and is capable of flowing. In a preferred embodiment of the invention, salt is defined only in a 2-D model. It is defined as a material region and all the nodes in the salt region are removed. The outer boundary of the salt region is set to be the initial border of the fluid used to represent the salt. The initial salt volume is set to correspond to the initial area of the salt material region. The salt material interacts only with the particles along the surface of the salt region. A force $f_P$ acts on each node i along the fluid interface. The fluid pressure depends on the fluid volume through a linear compressibility relation:

$$P = P_0 + \kappa_P(V_0 - V) \tag{14}$$

where $P_0$ is the initial salt pressure, $V_0$ is the initial salt volume and $k_P$ is the salt compressibility.

Figure 4C:
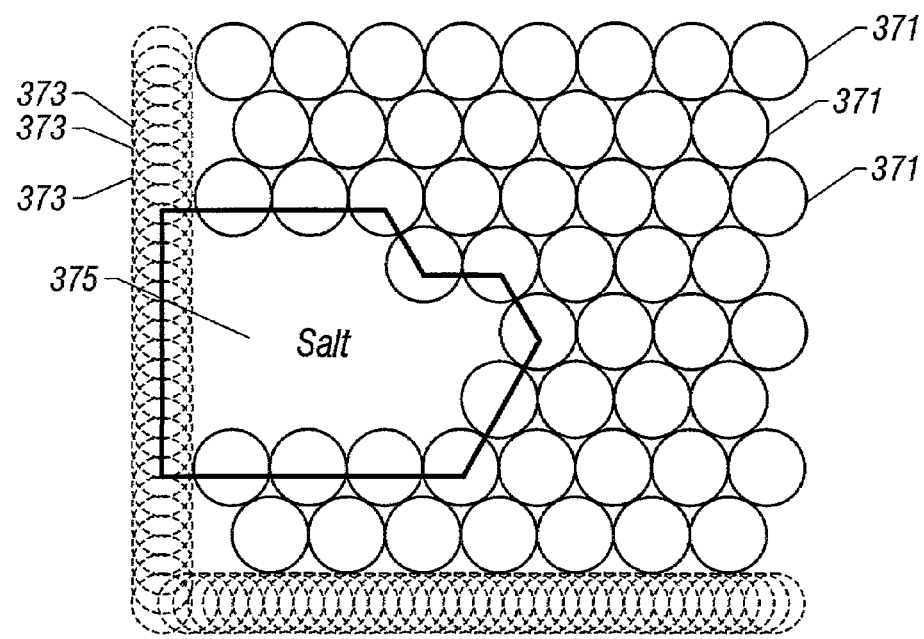

Special care is taken at the outer boundaries of the simulated material. If the salt region extends beyond the simulated material, it is connected to the wall particles in order to form a closed outer surface around the salt fluid. This is depicted schematically in FIG. 4c. The boundary particles are indicated by the dashed circles 373 while the material particles outside the salt region 375 are denoted by the solid circles 371.

In an alternate embodiment of the invention, the flow of the salt without fracturing is handled by a finite element code. While this results in more accurate simulations, it comes at the cost of greater computation time.

Conditioning of the Model

Returning now to FIG. 1, the process of conditioning the model is now discussed. In any model in which the modified Dynamic Range Relaxation method is applied, the final fracture (or fault) pattern depends on the order and the positions at which fractures (or faults) appear, because the formation of faults and fractures depends on the local stress field in the rock. For convenience, when the term fracture is used in this application, it is to be understood that faults are included, and vice-versa. This stress field, in turn, depends on the position and size of all faults and fractures. In order to produce a prediction of faulting on a finer scale than that known from field observations, 105 in FIG. 1 (e.g., from seismic data, geologic observations or from well information), the physical model must reproduce the main faults during the simulation in such a away that they are grown "naturally" during the deformation. The basic problem then is to find a method for determining the initial conditions of the rock material that produces the large-scale features known to be present, and, in addition, produce finer scale deformation that is not readily observable in the field.

As noted above, in the present model, the subsurface is represented by a set of nodes having elastic interconnection with adjoining nodes. The material properties of the material are described by the material properties of each node and each bond connecting the nodes. Each node is described by its geometrical size and the elastic constants of its interactions with other nodes. Each bond is described by its length, its elastic properties and by a breaking threshold that specify the maximum stresses (stretching, bending, torque, etc.) for the bond to break. If a bond breaks, it is removed from the model and the position of the broken bond is interpreted as fracture.

In order to force the model to produce particular faults in the final configuration, the initial configuration is modified. As noted above, field observations provide positions of the large-scale final deformation that the model must produce. The initial position of the faults is found by mapping the final position backwards in time. This is sometimes called palinspastic reconstruction. A trained geological interpreter is able to do this using certain well-known physical principles. For example, most geologically occurring formations have a relatively low strain value at fracturing, so that the total volume of rock must remain substantially constant during the reconstruction. In addition, once a rock is fractured, it must remain fractured in a forward simulation, so that in a palinspastic reconstruction running backwards in time, new faults cannot appear. In addition, the Anticipate process 111 in FIG. 1 discussed below makes it possible to get a fast approximate solution of the final deformation. This greatly reduces the experimentation required for an initial model. In any case, even the little experimentation that may be necessary is useful because each initial model may provide a somewhat different output for the minor faulting and fracturing that result. The resulting ensemble of outputs provides a range of possible scenarios for development of the hydrocarbon reservoir.

In addition to having an initial model that approximates the major faults, the general variation of the material properties must also be known. This can also be found by reverse modeling from the final deformation, and input into the model, as elastic properties and distributions of breaking thresholds.

The next step is to condition the fractures in this initial model. This is done by making it more probable that during the forward modeling, the fractures will appear in the vicinity of the positions defined initially. However, if the actual fracture positions are input into the initial model, the effect of interaction between the fractures would in the forward modeling would be relatively minor and the simulation would not produce the correct final fault pattern.

Accordingly, in the present invention, the material properties in the vicinity of the initial fault positions are modified.

Conditioning occurs along piecewise linear curves in two dimensions, and piecewise linear surfaces in 3-D. Conditioning is implemented as a weakening of all bonds that intersect this weakening curve or surface. The weakening depends on the distance from the center of the curve/surface, in order to ensure that the conditioned fracture grows from a center seed during the simulation.

Initially, the center of mass of the conditioning line or surface $\vec{x}_c$ is found. The breaking threshold $f_{i,j}$ of the bond from node i to node j is then weakened by a factor f(r)

$$f_{i,j} \rightarrow f_{i,j} f(r) \tag{15}$$

The weakening function increases from a value of 0 at the center, i.e., the bond will definitely break, to a value of 1 (no weakening) at a surface, called the rim of the conditioning surface. In the preferred embodiment of the invention, the weakening function is linear, although other forms may be used in alternate embodiments.

Intersections between the piecewise linear curve and a linear bond are readily resolved in 2-D models. In 3-D, the conditioning surface is specified by a series of lines Each line has a constant number of points: i=1, 2, . . . I. Each point $\{\vec{x}_{i,k}\}$ in the line k is connected to the points $\vec{x}_{i,k-1}$ and $\vec{x}_{i,k+1}$. This produces a series of surface elements defined by four corner points. Each rectangular surface element is divided into two triangles in order to determine possible intersections with bonds in the lattice. Possible intersections are found using standard methods of linear algebra.

The Anticipate Process

Another novel feature of the present invention is the ability to get a quick and dirty look (anticipate) at the result of an applied deformation. This step is denoted at 111 in FIG. 1 and is best understood by reference to FIG. 5.

Denoted is a portion of the grid, represented by points 401, 402, 403 . . . 407. An initial deformation is applied to points 402 and 403 so that they end up at the locations specified by 402' and 403'. The anticipate function gives an approximate solution to the post-deformation position of the remaining points in the lattice as a result of this applied deformation, assuming that they are points on an infinitely elastic substrate (or space).

Figure 5:
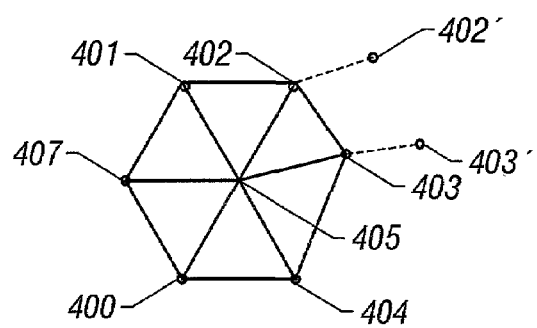
FIG. 5 is a schematic diagram illustrating the anticipate method of the present invention.

Denoting by $\vec{r}_{\{0,i\}}$ the initial positions of the n points where the deformation is applied and by $\vec{r}_i$ the ending position of the points where deformation is applied, a displacement of these points is defined by $\vec{d}_i = \vec{r}_i - \vec{r}_{\{0,i\}}$. In the example of FIG. 5, the initial points are 402, 403 and the final positions are 402', 403' and the displacements are the vectors joining 402 to 402' and 403 to 403'.

For an arbitrary point initially at $\vec{r}_0$, the end position is given by $$\vec{r}_i = \vec{r}_0 + \sum_{i=1}^{n} \vec{\vec{L}}_i e^{-x_i} \vec{d}_i \tag{16}$$

In eq. (16), $x_i$ is the distance between the position of the point in the undeformed lattice and the end position $\vec{r}_{\{0,i\}}$ of the i-th arrow, i.e., $$x = |\vec{r}_0 - \vec{r}_{\{0,i\}}|$$

In eq. 16, the matrix $\vec{\vec{L}}_i$ given by $$\vec{\vec{L}}_i = \begin{bmatrix} lx_i & 0 & 0 \\ 0 & ly_i & 0 \\ 0 & 0 & lz_i \end{bmatrix}, i = 1, 2, 3, \cdots,$$

$lx_i$, $ly_i$, and $lz_i$, are given by the solution of three sets of n equations with 3n unknowns:

$$\vec{r}_j = \vec{r}_{\{0,j\}} + \sum_{i=1}^{n} \vec{\vec{L}}_i e^{-|\vec{r}_{\{0,j\}} - \vec{r}_{\{0,i\}}|} \vec{d}_i \quad j = 1, 2, 3, \ldots n \tag{18}$$

In addition to local deformations, a number of uniform/global movements may be specified (extension, shear or rotations). For extension and shear, a line of no deformation is specified together with angles and total percentage deformation. For rotation (only 2-D models) a center of rotation, an angle and a radius of the area to be rotated is specified. This is sometimes referred to as a vortex. The amount of rotation decreases exponentially with the ratio of the distance from the specified center of rotation to the specified radius.

Figure 6:
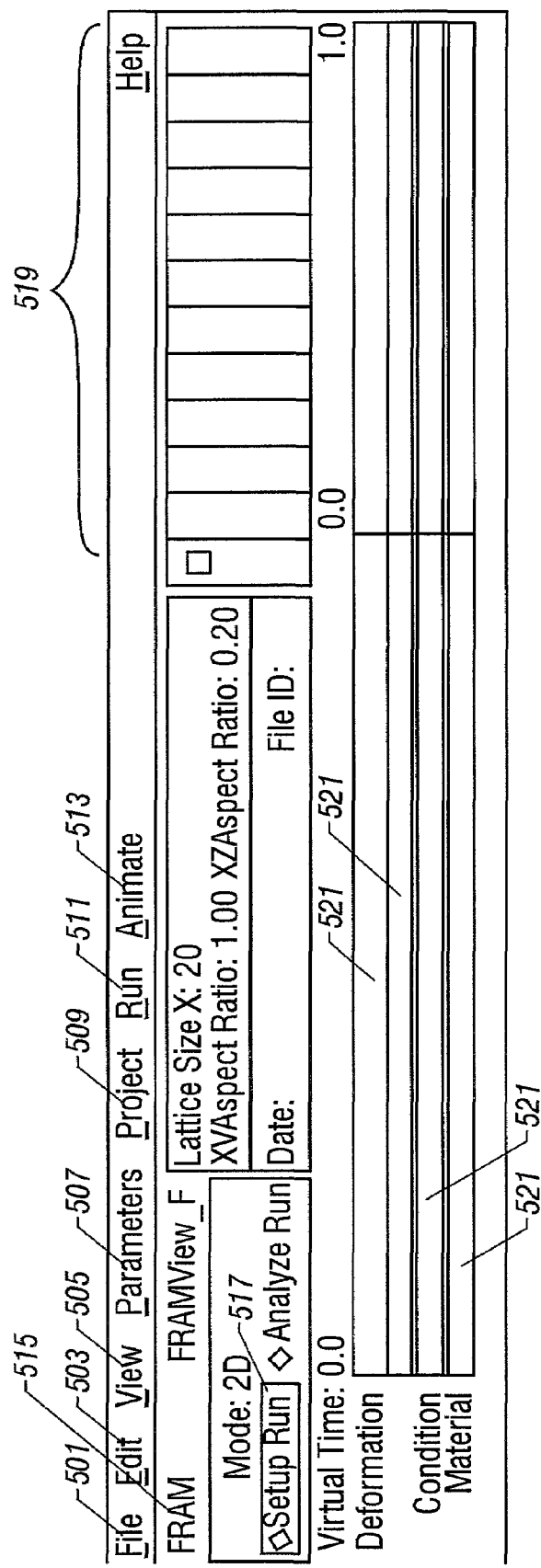
FIG. 6 is a view of the main panel of the Graphics User Interface (GUI) of the present invention.

In addition to the use described above, in a preferred embodiment of the invention, the anticipate step is also applied automatically in the background when the Dynamic Range Relaxation Algorithm is run. As noted above, deformations are specified by the user at selected points in the model. The "background" running of the anticipate step interpolates the user defined deformation to every point on the boundary and/or substrate as boundary condition for the relaxation algorithm The Graphical User Interface The Graphical User Interface (GUI) of the present invention is, as the name implies, a computer program that enables the user to define the model, manipulate the deformation process and view the results. The main panel for the GUI is illustrated in FIG. 6. It has a number of pull-down menus. Note that the labels assigned to the various buttons in the entire application and discussed herein are for convenience only and are not intended to be a limitation. The various options of pull-down menus are described here without actual illustrations of the pull-down options.

The file menu 501 includes the following options that are typical of many computer programs:

1. New erases all deformation history information.
2. Open produces a standard file selector that lets the user read in exiting files.
3. Delete allows the user to delete existing files.
4. Save allows the user to save the existing file.
5. Save as allows the user to save the existing file and specify the name under which it is to be saved.

6. Print allows the creation of an image file in a specified format. In a preferred embodiment of the invention, the format is a .gif file.

Still referring to FIG. 6, the Edit menu 503 has the following options:

1. Clear item removes one element of the deformation history, such as an extension or a region, based on the currently selected item.

2. Clear all removes all elements within a method, such as all material regions, based on the currently selected method.

3. Remove era removes an entire era based on the currently selected method. Eras are discussed below with reference to the timeline 521.

4. Preferences produces a separate panel used to set memory parameters and other preferences.

The View menu 505 provides the following options:

1. Set XY/XZ ratio lets the user stretch or shrink the section that is displayed in the graphics display.

2. Plane view switches to a display mode in which the displayed section is viewed at an angle of 90°.

3. 3D view switches to a display mode in which the viewpoint can be chosen freely by the user.

The Parameter menu 507 allows the user to select from a list including:

1. View parameters produces a panel displaying information about a setup.

2. Edit parameters allows the user to edit the run parameters. This is discussed below with reference to FIG. 8.

3. Set defaults sets default parameters and switches to an areal simulation mode.

The Project menu 509 includes the following options:

1. Anticipate lets the user anticipate the outcome of the simulation assuming that the deformed section is made of rubber that never breaks. This has been discussed above with reference to 111 in FIG. 1.

2. Make method allows the user to define a method of simulation and assigns a button to the selected method.

3. Remove method deletes the assignment made in (2) immediately above.

The Run menu 511 includes:

1. Start Run starts a simulation

2. Job Control produces a panel with a list of currently running simulations.

The Animate menu includes:

1. Make movie allows the user to select pattern files to be included in an animation.

2. Open Movie lets the user watch an animation of the simulation results.

The Run indicator 515 shows either 'FRAM' when no simulation is running or shows a fracture pattern that changes with time if a simulation is running.

The mode selector 517(not do be confused with the mode of definition of a model discussed above) allows operation in either the Setup Run or the Analyze Run. Depending upon the selection, some menu entries will be disengaged (grayed out) and other are engaged.

The Method Button Array 519. A method is a set of data that specifies a part of a deformation history—either a deformation method, a conditioning method of a material method. If the user clicks on one of the active method buttons, the cursor changes shape and the user may specify a timeline discussed below. The method button array shows deformation method buttons, conditioning method buttons or material method buttons. The method mode is changed by clicking on the appropriate timeline. Initially, the method button array contains only very few buttons, representing standard methods such as the "Empty deformation," a formation without any extensions or regions. Another standard method is the "Empty condition," a conditioning method without any fractures. Four other standard methods are the "Brittle material, the "Soft material", the "Very soft material", and "Sand." The user may build a library of methods and save them.

The Timeline 521 is used only in the setup mode. It comprises horizontal fields labeled "Deformation," "Condition," and "Material". If the user clicks on any of the timeline fields, the method button array 519 shows the method buttons that correspond to the selected mode and a corresponding method editor or "toolbox" appears on the bottom left of the screen (not shown). The horizontal fields may be further subdivided into slots. Each slot represents one method and a default value of one slot per field is set. A column of slots together defines one deformation era. In a preferred embodiment of the invention, up to three deformation eras may be specified. If multiple eras are specified, the simulator processes the first of them. The eras represent deformation events that occur sequentially. An alternate embodiment of the invention includes a restart feature so that processing may continue from one run to another without losing the benefit of earlier computer runs.

Figure 7:
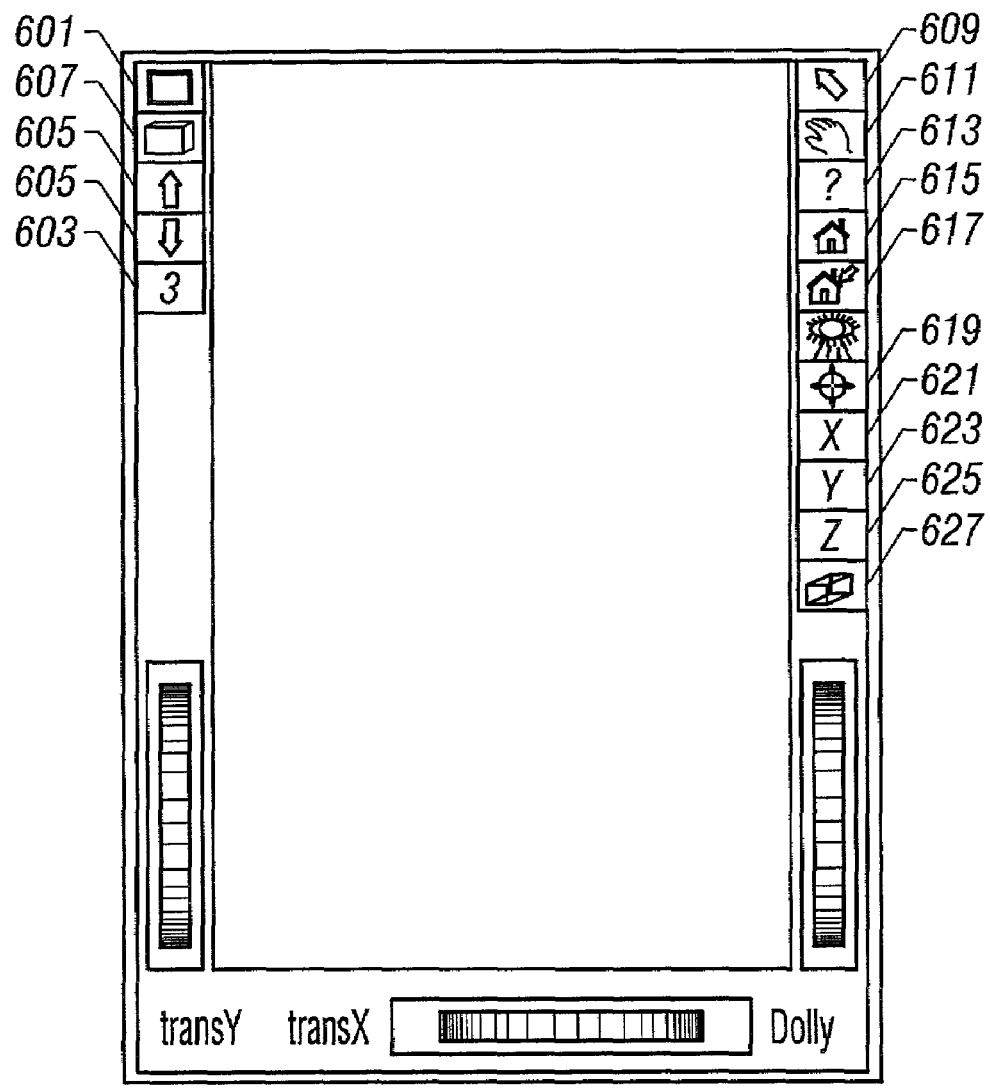
FIG. 7 is a view of the graphics display window of the GUI of the present invention.

Turning now to FIG. 7, the graphics display window in the center part of the screen is illustrated. This is used to set up a deformation history and to view the resulting fault patterns. Two view modes may be used, "Plane" and "3-D". The latter mode enables a free choice of the viewpoint in 3-D space. The former limits the viewpoint to the xy, yz, or zx planes. The user may switch from one view mode to the other by using either the menu entries in View menu 505 in FIG. 6 or by using the Screen button 601 in the graphics display window. In the cross-sectional and areal simulation mode, this screen button 601 is the only one in the left hand of the graphics display. In 3-D simulation mode additional buttons and a text window are visible. In 3-D simulation, the simulated section is conceptually divided into horizontal "planes"; the text window 603 indicates which plane is under consideration. Two arrow buttons 605 can be used to leaf through the planes. An additional button 607 enables the user to switch between "one-plane" and "all-planes" display.

Button 609 in the graphics display is used to switch to "pointer" cursor mode. In this cursor mode, the cursor takes the shape of an arrow, and items such as deformation arrows can be selected by clicking. The adjacent button 611 switches the cursor to the "hand" mode. In the hand cursor mode, the viewpoint may be changed in three dimensions by moving the mouse while holding the left button or the center button pressed. Additional buttons are provided for help (613), set home viewpoint (617), go to home viewpoint (615), show everything (619), and toggle perspective. 617 sets the current view as the "home view" so that when 615 is pushed, the display automatically returns to the "home view" without the user having to rotate or move the object back manually to it's "home view" location. 618, (the button not labeled below the 617 button) changes the view point so that all of the current figure fits within the display. This button is used if one has zoomed in so far that all of the object is no longer visible on the screen. 618 automatically zooms out so that all of the object fits in the window. 627 toggles between a perspective view and non-perspective view. A perspective view has a focal point; a non-perspective view does not. X (621), Y (623), and Z (625) set the views to be on the X, Y, and Z axes respectively. 619 defines a pointed that can be positioned on the screen to define the center of the view. That is, a cross symbol appears when this button is pushed. It can be moved in the viewing window to a desired point. When the left mouse button is pushed again, the center of the cross symbol becomes the center of the viewing window.

On the lower frame of the graphics display window, wheels are shown for changing the point of view in an alternative manner. Alternatively, when button 611 is pushed, a "hand" appears in the window display. If the left or center mouse button is held down while moving the mouse, the "hand" drags the object in the display window, either rotating it (if the left mouse button is pushed) or moving it (without rotation—if the center mouse button is pushed).

Within the graphics display, a number of editing steps may be carried out. For example, the position of a deformation arrow of a deformation region, a conditioning fracture, or a material region may be moved. This is accomplished by switching to the pointer cursor mode 609, and clicking on the object to be moved. Holding the mouse button depressed, the object may be moved to its final destination. In a deformation method, localized extensions are represented by single arrows with a footprint and a tip. By clicking on either the tip or the foot and holding the left mouse button, the position can be moved. By clicking on the body of the arrow, the entire arrow may be moved.

Uniform extensions and shears are represented by double arrows. By clicking on one of the tips and holding down the left mouse button, the percentage of extension may be adjusted. By clicking on the center point and holding down the left mouse button, the entire double arrow may be moved. The angle of the double arrow with respect to vertical is set by clicking on one of the arrow bodies and holding the mouse depressed. Among other items that may be edit graphically are the center of rotation, the vertices of deformation regions, material regions and conditioning fractures. A vortex may be added or removed to a selected region or fracture.

The Parameter Panel

Figure 8:
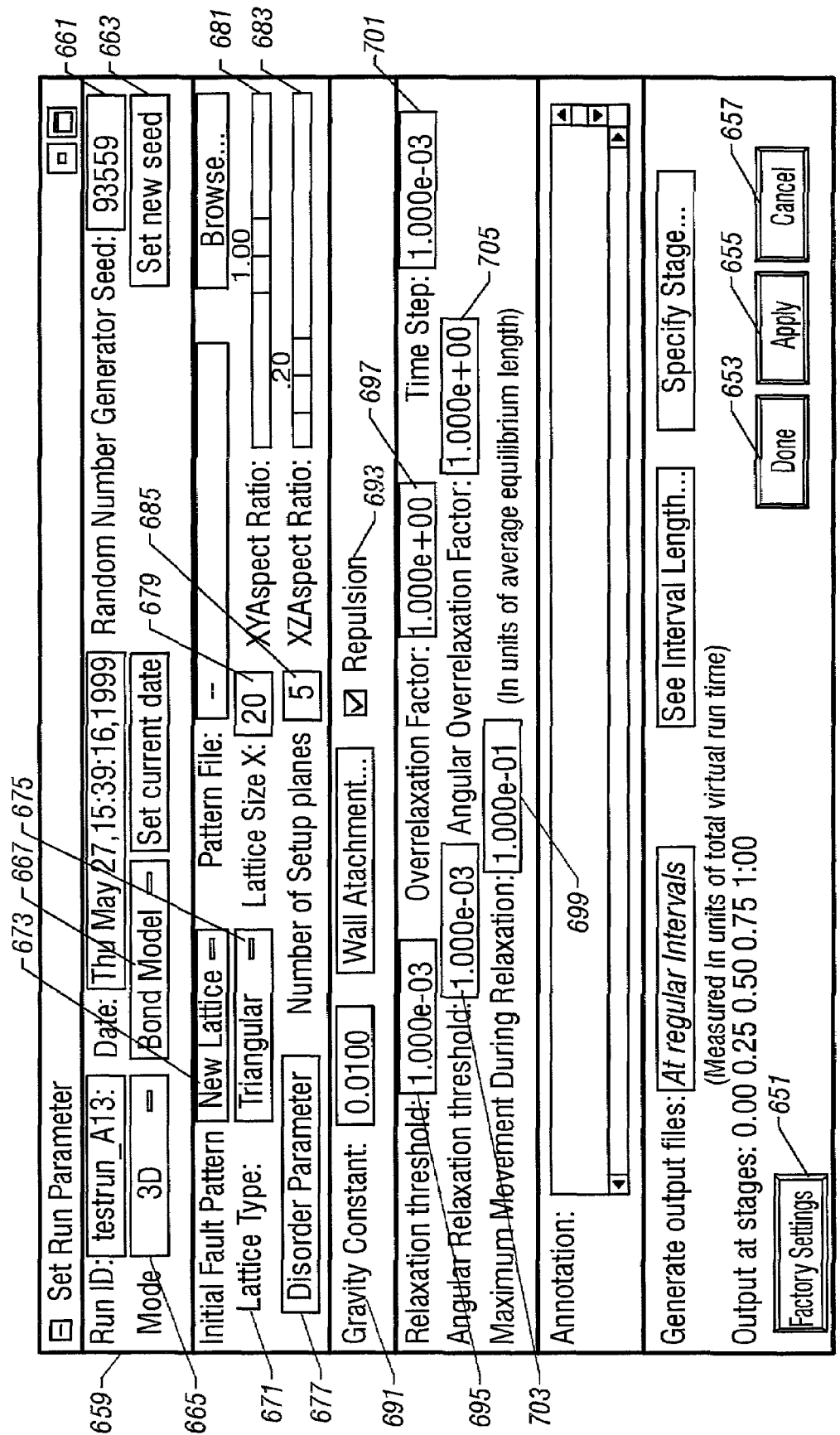
FIG. 8 is a view of the parameter definition panel of the GUI of the present invention.

The parameter panel pops up if the Edit parameter button is selected at 507 in FIG. 6. Turning now to FIG. 8, there are four control buttons at the bottom of the parameter panel. The factory settings 651 sets the parameters to their default values and switches to areal simulation mode. Done 653 accepts the settings and closes the parameter panel. Apply 655 accepts the settings without closing, and Cancel 657 ignores the settings and closes the window.

The top section of the panel 659 includes a button 661 for setting the random number generator used to set up the network of nodes. Alternatively, the set new seed button 663 sets up a random number based upon the machine clock. The mode button 665 sets the model to areal, cross-sectional or 3-D model. Button 667 selects the type of connection between the nodes, i.e., to either spring or beam.

In the second section of the panel 671, button 673 enables the user to switch between a newly generated lattice and an "old" lattice from an earlier simulation. The type of lattice is set using button 675 to be either triangular or disordered. If a disordered lattice is selected, the disorder parameter button 677 is engaged. The lattice size in the x direction is set using button 679 and the sizes in the y and z directions are set using the aspect ratio sliders 681 and 683. Optionally, the number of planes in the vertical direction may be set using the button 685.

As noted above, in the cross-sectional and 3-D simulations, gravity is taken into account. The gravity constant is set in window 691. During the simulation, nodes may come close to each other. To avoid this unphysical "compression", the preferred embodiment of the invention includes the repulsion toggle switch 693. This may be turned off by the user.

As discussed above, the simulation in the present invention is based upon a relaxation scheme. Convergence of the relaxation scheme is controlled by parameters set in the relaxation threshold 695, over-relaxation factor 697, maximum movement during relaxation 699 and time step 701 buttons. These parameters have been discussed above with reference to 115 in FIG. 1. If a beam simulation is used 667, additional parameters are set in angular relaxation 703, and angular over-relaxation factors 705. These have also been discussed above with reference to 115 in FIG. 1. The thresholds greatly influence the speed of the simulation and for initial simulation work with a model, a high threshold of 0.0001 is recommended. For subsequent detailed simulation, the threshold may be lowered.

Figure 9A:
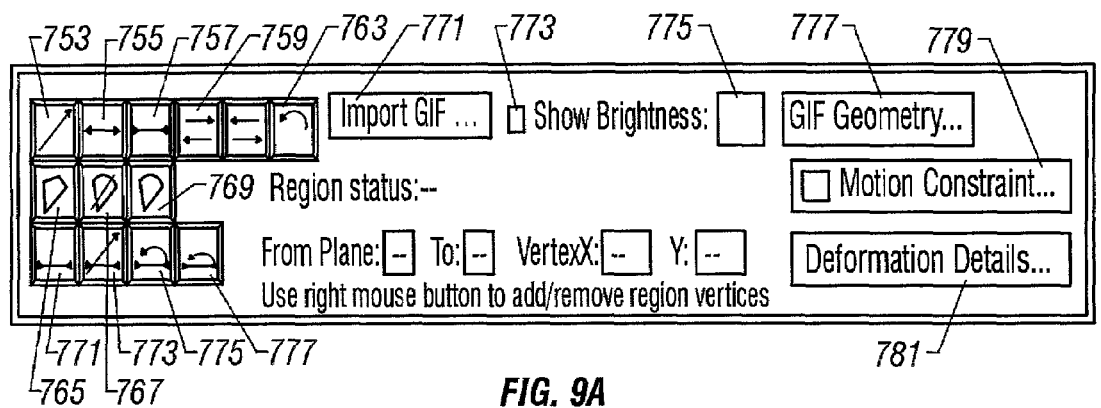
FIGS. 9a, 9b show a view of the deformation editor of the GUI and a view of two deformations regions in the lowest plane of a 3-D simulation

The deformation editor is invoked at 521 in FIG. 6. The deformation editor is used to specify the deformation to be applied in the simulation. The screen display 751 is shown in FIG. 9a. The top row of buttons is used to introduce extensions and rotations into the model. The localized extension button 753 is labeled with a single arrow. The two adjacent buttons 755, 757 represent uniform extension and uniform compression. The buttons labeled with opposing arrows 759, 761 represent uniform right and left lateral shear respectively. The button 763 is used to introduce rotation. The button 765 is used to introduce a deformation region in the areal simulation mode or on the lowest plane in 3-D simulation. The adjacent buttons 767, 769 are used to define a translation and rotation to the region defined by 765. In the simulation, the region defined by 765 will move stiffly according to the specified translation and rotation.

The button 771 is used to introduce a deformation region in the cross-sectional mode or on the higher planes in 3-D simulation mode. These regions can include only boundary nodes. The other three buttons 773, 775, 777 are used to assign a translation, rotation and tilt to the region.

The present invention includes the ability to use a previously defined image in the deformation editor. When the import GIF button 771 is pressed, a .gif file may be read in and superimposed on the model grid. The image may be obtained from geologic or seismic maps of a subsurface region. The image may be toggled on and off and its brightness may be adjusted using buttons 773, 775. The button GIF geometry produces a window that can be used to adjust the position of the background image. Included are horizontal and vertical translation and rotation. The motion constraint button 779 is used to constrain the movement of the cursor. The deformation details button 779 leads to another pop-up menu that gives further information about the exact position and settings of a selected image.

Figure 9B:
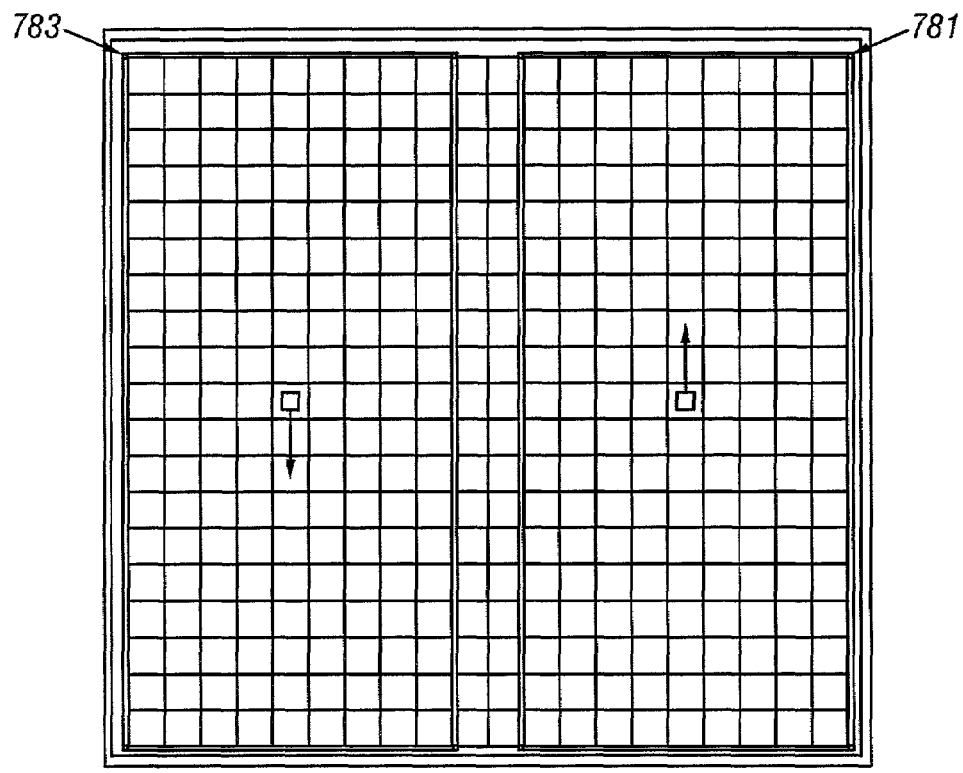
Figure 10:
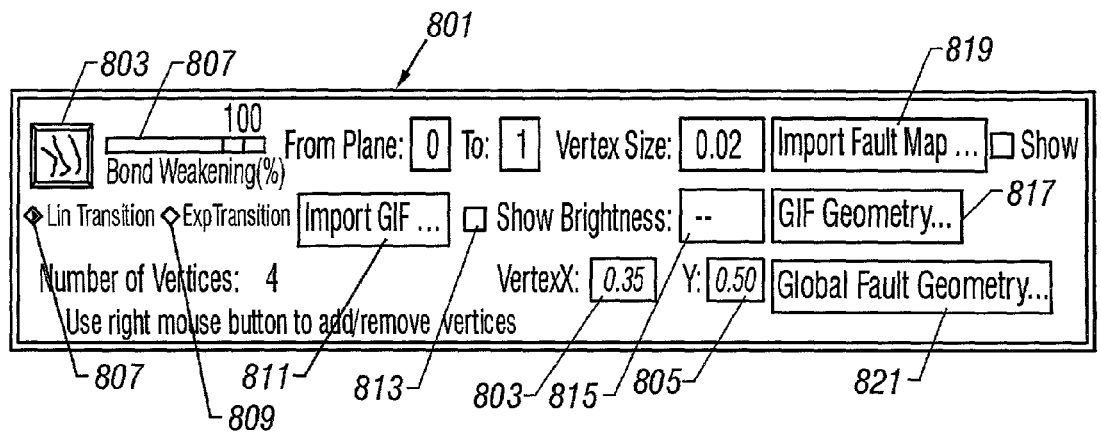
FIG. 10 is a view of the condition editor of the GUI.

FIG. 9b shows an example a setup for a 3-D simulation with two deformation regions 781, 783 in the lowest plane, each associated with a stiff translation.

The Conditioning Editor is invoked at 521 in FIG. 6. The conditioning editor is used to condition the model as discussed above in reference to 107 in FIG. 1. The display menu 801 for the conditioning editor includes a fault button 803 to introduce a new pre-existing fault into the lattice. By default, the new fault is placed in the center of the lattice and has two vertices. The user may add more vertices by selecting the fracture and clicking on the right mouse button. The position of the currently selected vortex is indicated in the Vertex X and text windows 803, 805. By default, the new fault weakens the lattice by 100%. The user may adjust the weakening using the bond weakening slider 807. A weakening of 0% has no effect. The linear and exponential transition buttons are used to define the decay of the weakening of the bonds away from the fault. This was discussed above with reference to 107 in FIG. 1. The import GIF button 811 selects an image file. The toggle show 813, brightness 815 and GIF geometry 817 are similar to those described above in the Deformation Editor in reference to FIG. 9a.

Figure 11:
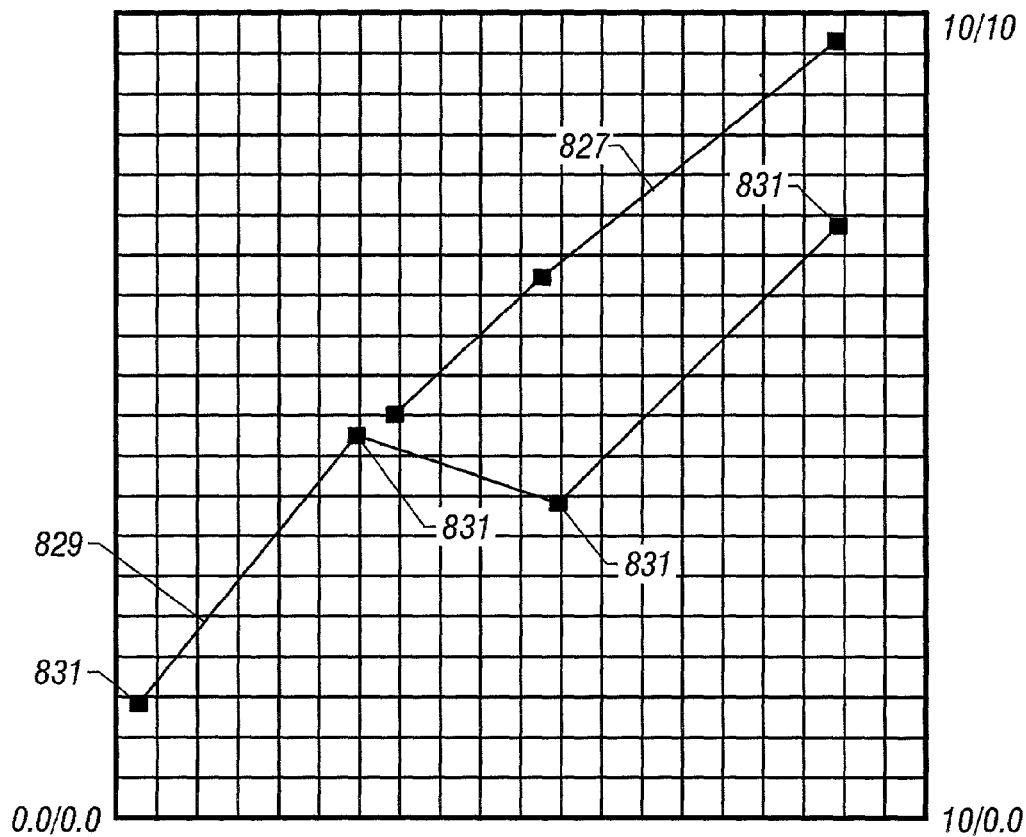
FIG. 11 shows the set up for an aerial or cross-sectional simulation with an imported fault map

An alternative embodiment of the invention reads in preexisting fault patterns (importing) as a data file, such as an ASCII-file, in which sets of vertices are specified. This is done using the Import fault map button 819. Both specified faults and imported faults can be translated, stretched or shrunk using the Global Fault geometry button 821. An example of an imported fault is shown in FIG. 11 wherein there are two faults 827 and 829 indicated, with the fault 829 characterized by vertices 831.

The material editor is invoked at 521 in FIG. 6. The material editor is used to specify material methods. A material method always contains a base material that covers the entire lattice. The material editor is used to set the properties of the base region. These properties translate directly into the statistical distributions that are used to set up the network of springs and nodes that underlies the simulation. In addition, material regions can be defined that cover only part of the lattice. The properties of these regions supersede the properties of the base region. Note that if these "higher order" regions overlap, the material properties depend upon the order of their specification, with the last defined material properties prevailing.

The two buttons 851, 853, labeled as "R" and "S", are used to introduce the higher order regions. "R" stands for a rock region and "S" stands for a salt region. In a preferred embodiment of the invention, there is only one salt region, though in alternate embodiments of the invention, more than one salt region may be defined. From the standpoint of simulation, rock and salt differ fundamentally in that the rock can be modeled as a network of springs and nodes (or beams and nodes) whereas salt cannot. In the setup, this is reflected by the fact that the salt properties take on "unphysical" values by default and cannot be changed to "reasonable" ones.

By default, each new "higher order" region has the shape of a square and is located in the center of the lattice. The shape and position may be manipulated as discussed above. The LinBondThrs'Mean button 855 is used to set the mean linear extension breaking threshold of bonds. The LinBondThrs'Sdev 857 is used to set the standard deviation of the breaking threshold of springs. If this number is large relative to the mean (0.05), the region may be considered a soft material; if it is small (0.01), the region may be considered brittle. The Density button 859 is used only if gravity is relevant and sets the density of the nodes. The ShearStressThrs'Mean and ShearStressThrs'Sdev buttons 861, 863 are used to set the mean shear stress breaking threshold and the standard deviation thereof for a beam model. The ExcessHght button 865 sets the excess height, a quality used in cross-sectional simulation mode in order to restrain the motion of boundary nodes, and specifies the height of the side walls in units of the material thickness. The force constants button 867 produces a separate window wherein additional material properties are specified.

The Material Force Constant Panel

Figure 12:
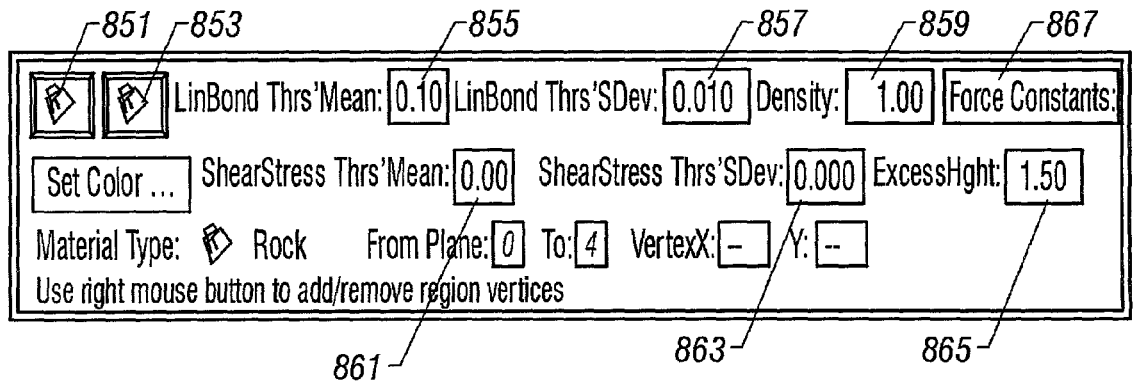
FIG. 12 is a view of the material editor panel of the GUI.
Figure 13:
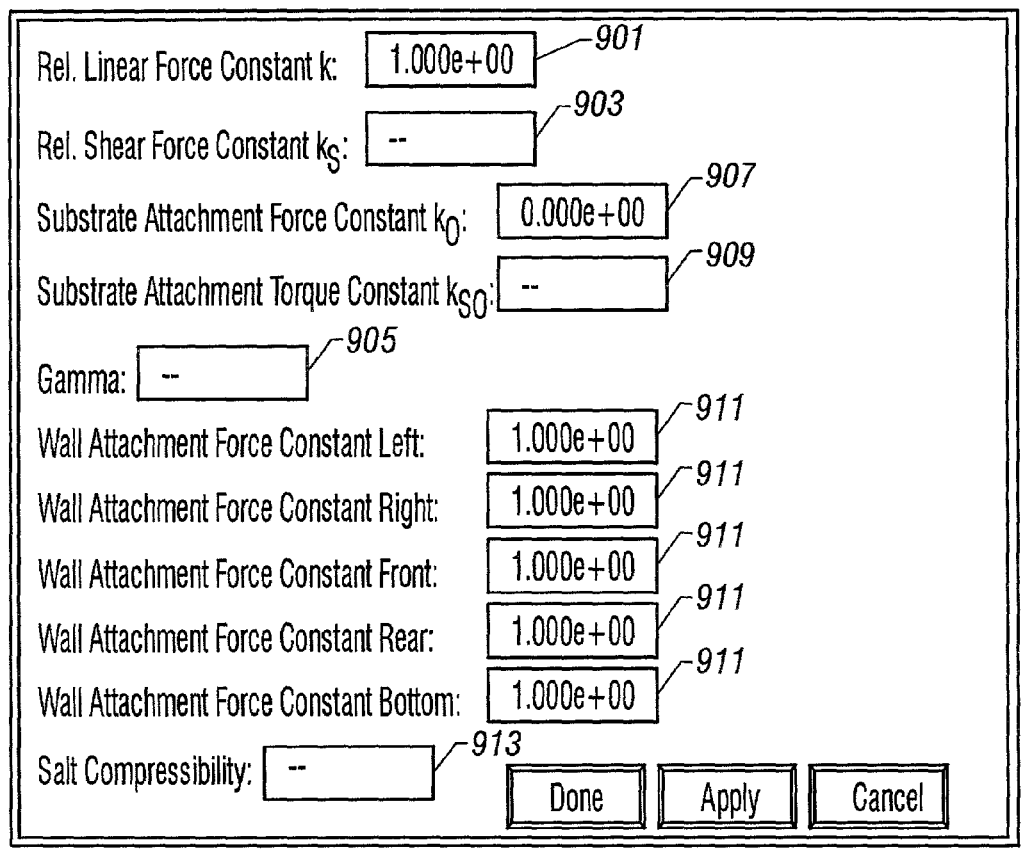
FIG. 13 is a view of the material force constants panel of the GUI.

This panel, shown in FIG. 13, appears when the Force constants button 867 in FIG. 12 is pressed. It contains a number of text windows used top specify the constants that control the faulting properties of the material. The Rel. Linear force constant k is the local force relative to the overall force constant $k_0$. For the base material, the value of Young's modulus $E_0$ is given. For other regions consisting of different materials with different elastic properties, the relative changes are given by k. Thus, for a region with an elastic constant E, the relative linear force constant is $k=E/E_0$. It is recommended that in the base region, the value should always be set equal to 1.0 to ensure stability of the simulation code. In "higher order" material regions, this can take a value different from 1.0 for stronger or weaker materials than the base material. If k=0, then that region will have no elastic interactions and the simulation will produce unphysical results.

Rel. Shear force Constant $k_s$ 905 is a scale factor for all shear force constants, i.e., those that are relevant only to a beam simulation model. Generally, $k_s$ is a function of Poisson's ratio v and the beam thickness a, which is an additional free parameter. As would be known to those versed in the art, the value of $k_s$ must not be set to arbitrary values as this may correspond to unphysical values of Poisson's ratio. $k_s$ is given by $$k_s = \frac{1}{2} \frac{1}{2(1+v) + \left(\frac{1}{a^2}\right)} \qquad (17)$$

Theoretically, $-1 < v < \frac{1}{2}$ and $0 < a < 1$. However, for most materials of geologic interest, $v > 0$. It is recommended that the user of the invention set values such that $0.1 < v < 0.3$ and $0.5 < a < 1.0$ Gamma 905 is also a parameter related to beam bending. It too is related to Poisson's ratio and the beam thickness. It is given by $$\Gamma = 2(1+v)\frac{1}{12}\left(\frac{a}{l}\right)^2 \qquad (18)$$

Substrate attachment force $k_0$ 907 gives the strength of the substrate attachment springs relative to the internode springs. For areal simulations, a value larger than 0 must be chosen in order to provide an imposed stress. However, for cross-sectional and 3-D simulations, the value is fixed to 0 because for these systems an attachment to an underlying substrate would impose an unphysical boundary condition. In the beam model, the substrate attachment can also carry torques, and each node is attached to the substrate by a torsional spring, with torque spring constant $k_{s0}$ 909 relative to the internode spring constant.

Wall attachment force constants 909 define the attachment of the walls to the boundary nodes. The force constants are measured in units of the background force constant $k_0$. A positive value indicates an attractive force while a negative value indicates a repulsive force.

Salt compressibility 909 is the linear compressibility of the salt relative to the Young's modulus elasticity of the simulated material. Values between 0.5 and 0.9 are recommended.

Analysis Editor

The analysis editor is the main tool to control the display of fault patterns resulting from simulations. The main features are:

1. Redraw pattern causes the graphic display to be cleared and a fault pattern is displayed again.

2. Show bonds determines whether bonds connecting the nodes are displayed.

3. Render quality controls the quality (detail) of display of the fault patterns.

4. Show faults controls the display of faults.

5. Show stress map engages the computation of stresses in the model.

Stresses may be displayed in color displays of a selected component of stress or by vector displays. The user has control over the scale of the displays.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of modeling faulting and fracturing in a subsurface volume of the oath comprising:
   (a) selecting a mode of definition of a subsurface model, said mode of definition selected from (i) an aerial mode wherein the model comprises a plurality of nodes in a horizontal plane interconnected to each other and to a substrate, (ii) a cross sectional mode wherein the model comprises a plurality of nodes in a vertical plane interconnected to each other and a substrate defining edges of the model, and (iii) a 3-D mode wherein the model comprises a plurality of nodes interconnected to each other and to a substrate defining edges of the model;
   (b) defining said subsurface model including specifying material rock properties within the subsurface volume;
   (c) specifying an initial deformation pattern; and
   (d) using a dynamic range relaxation algorithm to find a force equilibrium solution for said subsurface model and said initial deformation pattern giving a resulting deformed model including fracturing;
wherein said model further comprises a plurality of springs connecting at least one selected node of said plurality of nodes with (i) a plurality of nearest neighbors of the at least one selected node, and (ii) a plurality of next nearest neighbors of the at least one selected node.

2. The method of claim 1, wherein said nodes are arranged in a substantially space-filling grid.

3. The method of claim 1, wherein defining said subsurface model further comprises defining a normal force associated with each of said plurality of springs.

4. The method of claim 1, wherein specifying said initial deformation pattern further comprises performing a reconstruction based at least in pan upon an observed large-scale deformation corresponding to said subsurface volume.

5. The method of claim 4, wherein said reconstruction is comprises a palinspastic reconstruction.

6. The method of claim 4, wherein obtaining said initial deformation pattern further comprises:
   (i) obtaining a trial deformation pattern from said observed large scale deformations,
   (ii) applying an anticipate method to said model using said trial deformation, giving an approximate deformation result wherein said approximate deformation result is exclusive of fractures or faults; and
   (iii) updating said trial deformation based on a comparison of said approximate deformation result and said observed large scale deformation thereby giving said initial deformation pattern.

7. The method of claim 4, further comprising conditioning said subsurface model thereby increasing the likelihood of said resulting deformed model including said observed large scale deformations, said conditioning including a weakening of bonds between adjacent ones of said plurality of nodes over at least a portion of the subsurface model.

8. The method of claim 1, wherein using the dynamic range relaxation algorithm further comprises applying said initial deformation model to said substrate in a plurality of steps, each step comprising a applying specified fraction of the initial deformation to said substrate and determining if any bonds between the nodes have been deformed beyond a breaking point and identifying a subset of the bonds that have been so deformed.

9. The method of claim 8, wherein applying the dynamic range relaxation algorithm further comprises iteratively breaking the one bond of the subset of bonds that has been deformed the most and applying a relaxation algorithm to the remaining unbroken bonds.

10. A method of modeling faulting and fracturing in a subsurface volume of the earth comprising:
    (a) selecting a mode of definition of a subsurface model, said mode of definition selected from (i) an aerial mode wherein the model comprises a plurality of nodes in a horizontal plane interconnected to each other and to a substrate, (ii) a cross sectional mode wherein the model comprises a plurality of nodes in a vertical plane interconnected to each other and to a substrate defining edges of the model, and (iii) a 3-D mode wherein the model comprises a plurality of nodes interconnected to each other and to a substrate defining edges of the model;
    (b) defining said subsurface model including specifying material rock properties within the subsurface volume;
    (c) specifying an initial deformation pattern; and
    (d) using a dynamic range relaxation algorithm to find a force equilibrium solution for said subsurface model and said initial deformation pattern giving a resulting deformed model including fracturing;
wherein said model further comprises a plurality of rods connecting at least one selected node of said plurality of nodes with a plurality of nearest neighbors of the at least one selected node.

11. The method of claim 10, wherein said nodes are arranged in a substantially space-filling grid.

12. The method of claim 10, wherein defining said subsurface model further comprises defining a force associated with an angle between pairs of said adjacent ones of the plurality of rods.

13. The method of claim 12, wherein using the dynamic range relaxation algorithm further comprises applying said initial deformation model to said substrates in a plurality of steps, each step comprising a applying specified fraction of the initial deformation to said substrates and determining if any angle between pairs of nodes have been deformed beyond a breaking point and identifying a subset of the angles that have been so deformed.

14. The method of claim 13, wherein applying the dynamic range relaxation algorithm further comprises iteratively breaking the one angle of the subset of angles that has been deformed the most and applying a relaxation algorithm to the remaining angles.

15. The method of claim 10, wherein specifying said initial deformation pattern further comprises performing a reconstruction based at least in part upon an observed large-scale deformation corresponding to said subsurface volume.

16. The method of claim 15, wherein said reconstruction comprises a palinspastic reconstruction.

17. The method of claim 15, wherein obtaining said initial deformation pattern further comprises:
(i) obtaining a trial deformation pattern from said observed large scale deformations,
(ii) applying an anticipate method to said model using said trial deformation, giving an approximate deformation result wherein said approximate deformation result is exclusive of fractures or faults; and
(iii) updating said trial deformation based on a comparison of said approximate deformation result and said observed large scale deformation thereby giving said initial deformation pattern.

18. The method of claim 15 further comprising conditioning said subsurface model thereby increasing the likelihood of said resulting deformed model including said observed large scale deformations, said conditioning including a weakening of bonds between adjacent ones of said plurality of nodes over at least a portion of the subsurface model.

* * * * *

UNITED STATES PATENT AND TRADEMARK OFFICE
CERTIFICATE OF CORRECTION

PATENT NO. : 7,043,410 B2
APPLICATION NO. : 09/949966
DATED : May 9, 2006
INVENTOR(S) : Anders Malthe-Sorenssen et al.

It is certified that error appears in the above-identified patent and that said Letters Patent is hereby corrected as shown below:

Title Page, Col. 2, line 12 of the Abstract;
In "Abstract" please delete "cross section" and insert --cross-section--
Column 4, line 40, please insert --.-- after the word "neighbors"
Column 4, line 60, please insert --.-- after the word "simulation"
Column 4, line 63, please insert --.-- after the word "map"
Column 7, line 36, please delete "cross section" and insert --cross-section--
Column 8, line 54, please insert --.-- after "δt"
Column 9, line 8, please insert --.-- after "2c"
Column 9, line 65, please delete " cross section" and insert --cross-section--
Column 14, line 32, please delete "cross sectional" and insert --cross-sectional--
Column 16, line 32, please insert --.-- after "[0039]"
Column 27, line 24, please delete "cross sectional" and insert --cross-sectional--

Signed and Sealed this

Twenty-ninth Day of August, 2006

JON W. DUDAS
*Director of the United States Patent and Trademark Office*